(12) United States Patent
Hadad

(10) Patent No.: US 6,985,432 B1
(45) Date of Patent: Jan. 10, 2006

(54) OFDM COMMUNICATION CHANNEL

(76) Inventor: Zion Hadad, 48 Haalmogim St., Rismon Lezion (IL)

(*) Notice: Subject to any disclaimer, the term of this patent is extended or adjusted under 35 U.S.C. 154(b) by 0 days.

(21) Appl. No.: 09/493,662

(22) Filed: Jan. 28, 2000

(51) Int. Cl.
- H04B 7/216 (2006.01)
- H04J 1/00 (2006.01)
- H04J 11/00 (2006.01)
- H04L 5/16 (2006.01)
- H04L 27/08 (2006.01)

(52) U.S. Cl. ............ 370/203; 370/206; 370/342; 370/480; 375/222; 375/375

(58) Field of Classification Search ............ 370/203, 370/208, 210, 206, 207, 343, 480, 482; 375/261, 375/364, 371, 222, 326, 344, 355
See application file for complete search history.

(56) References Cited

U.S. PATENT DOCUMENTS

| | | | | |
|---|---|---|---|---|
| 5,608,764 A | * | 3/1997 | Sugita et al. | 375/344 |
| 5,694,389 A | * | 12/1997 | Seki et al. | 370/208 |
| 5,771,224 A | * | 6/1998 | Seki et al. | 370/206 |
| 5,809,096 A | * | 9/1998 | Martinez et al. | 375/375 |
| 5,812,523 A | * | 9/1998 | Isaksson et al. | 370/208 |
| 5,872,775 A | * | 2/1999 | Saints et al. | 370/342 |
| 5,933,421 A | * | 8/1999 | Alamouti et al. | 370/330 |
| 6,021,110 A | * | 2/2000 | McGibney | 370/208 |
| 6,091,702 A | * | 7/2000 | Saiki | 370/203 |
| 6,314,083 B1 | * | 11/2001 | Kishimoto et al. | 370/210 |
| 6,370,188 B1 | * | 4/2002 | Wu et al. | 375/222 |
| 6,459,679 B1 | * | 10/2002 | Kim | 370/208 |
| 6,470,030 B1 | * | 10/2002 | Park et al. | 370/480 |

* cited by examiner

Primary Examiner—Man U. Phan

(57) ABSTRACT

In an OFDM-based receiver, a time synchronization unit comprising: A. a device for extracting pilot signals contained in the OFDM received signal; B. a device for analyzing pilot signals in the frequency domain and for issuing a signal indicative of a synchronization error in the received signal; C. a device for correcting the synchronization error, responsive to the signal indicative of the synchronization error. In an OFDM-based receiver, an automatic frequency correction device in a subscriber unit comprising: A. an inner frequency correction loop for generating a LO frequency related to a frequency of a received signal; B. an outer frequency correction loop for correcting the LO frequency according to instructions received from a base station.

4 Claims, 20 Drawing Sheets

Influence of linear group-delay distortion on the performance of the three modulation schemes.

OFDM COMMUNICATION CHANNEL

FIELD OF THE INVENTION

This invention relates to OFDM communication channels, and more particularly to improvements in channel performance using signal processing of pilot signals in the channel.

BACKGROUND OF THE INVENTION

Advanced communications today may use the Orthogonal Frequency Division Multiplex (OFDM) modulation for efficient transmission of digital signals. These signals may include video, voice and/or data. OFDM is a commonly used implementation of Multi-Carrier Modulation (MCM).

The Orthogonal Frequency Division Multiplex (OFDM) is a modern advanced modulation method, that achieves better use of the frequency spectrum.

OFDM has been used in recent years in many applications where robustness against severe multipath and interference conditions is required, or a high system capacity, flexibility in providing variable bit rate services, scalability and a capability to perform well in Single Frequency Networks (SNF). OFDM forms the basis for various communication standards, including for example the Digital Terrestrial Television Broadcasting, wireless LANs and Wireless Local Loops.

OFDM requires an advanced signal processing. Thus, a block of information is divided among N frequency channels, so that a portion of the information is transmitted in each of the abovementioned channels or frequencies. Since each channel is orthogonal to the others, a better utilization of the frequency spectrum is achieved.

In OFDM, since each symbol is N times longer, the percent overlap between adjacent symbols decreases, hence the Inter-Symbol Interference ISI is lower. Still better spectrum utilization is achieved by QAM (Quadrature Amplitude Modulation) on each of the N carriers.

An IFFT (Inverse Fourier Transform) is performed on the modulated carriers, to form the signal in the time domain that corresponds to the above modulated carriers. The signal is transmitted as a frame that contains the block of information to be transmitted.

A possible problem in the above modulation scheme may be an error in the time synchronization between signals.

When there is a time synchronization error, the signals after FFT in the various subchannels are rotated with respect to each other. This effect creates interference within the subchannel Another problem is a frequency error between the transmitted signal and the receiver. A frequency error generates a frequency shift that may change the location of symbols and/or may generate interference between symbols.

Because of channel imperfection, a time or phase delay may be generated between the various parts of the spectrum of the transmitted signal.

This distortion of the frequency spectrum of the transmitted signal may interfere with the signal reconstruction in the receiver.

The problem is further aggravated by multipath. Multipath may cause several replicas of a signal to be received, each possibly having a different time delay, amplitude and polarity.

These signals may result in interference between adjacent transmitted frames.

Prior art systems apparently are different.

Thus, Seki et al., U.S. Pat. No. 5,771,224. discloses an orthogonal frequency division multiplexing transmission system and transmitter and receiver therefor. It transmits an OFDM transmission frame, with null symbols and reference symbols being placed in the beginning portion of the frame and QPSK symbols are placed in an information symbol data region in the frame, with equal spacing in time and frequency.

The carrier amplitude and phase errors are corrected by a correction information producing section on the amplitude and phase variations of the received signal detected by the variation detector to produce corrected information.

Baum et al., U.S. Pat. No. 5,802,044, discloses a multi-carrier reverse link timing synchronization system. A center station transmits a forward link signal, receives a reverse link signal, and determines a timing offset for signals received on a reverse link timing synchronization channel. A reverse link symbol timing synchronization can be used in a system having a plurality of transmitting overlap bandwidth subscriber units on an OFDM-like spectrally overlapping reverse channel. The modulation method may comprise M-ary Quadrature Phase Shift Keying(M-PSK), M-ary Quadrature Amplitude Modulation (QAM) or other digital modulation method.

Gudmundson et al., U.S. Pat. No. 5,790,516, discloses a method and system for pulse shaping for data transmission in an orthogonal frequency division multiplexed (OFDM) system.

Yamauchi, et al., U.S. Pat. No. 5,761,190, discloses an OFDM broadcast wave receiver. An OFDM (Orthogonal Frequency Division Multiplex) broadcast wave receiver for receiving an OFDM broadcast wave.

It automatically discriminates whether the received signal is of a wide band or a narrow band by determining if a carrier signal having a predetermined frequency is present among signals of a plurality of frequencies, acquired by OFDM demodulation of the reception signal by demodulation means.

It also controls the demodulating operation of the demodulation means in accordance with the discrimination result to thereby acquire a demodulated signal.

Schmidl, et al. U.S. Pat. No. 5,732,113, discloses a a method for timing and frequency synchronization of OFDM signals. It relates to a method and apparatus that achieves rapid timing synchronization, carrier frequency synchronization, and sampling rate synchronization of a receiver to an orthogonal frequency division multiplexed (OFDM) signal. The method uses two OFDM training symbols to obtain full synchronization in less than two data frames. A first OFDM training symbol has only even-numbered sub-carriers, A second OFDM training symbol has even-numbered sub-carriers differentially modulated relative to those of the first OFDM training symbol by a predetermined sequence.

Synchronization is achieved by computing metrics which utilize the unique properties of these two OFDM training symbols. Timing synchronization is determined by computing a timing metric which recognizes the half-symbol symmetry of the first OFDM training symbol. Carrier frequency offset estimation is performed in using the timing metric as well as a carrier frequency offset metric which peaks at the correct value of carrier frequency offset. Sampling rate offset estimation is performed by evaluating the slope of the locus of points of phase rotation due to sampling rate offset as a function of sub-carrier frequency number.

Awater, et al. U.S. Pat. No. 5,862,182, discloses an OFDM digital communications system using complementary codes.

The encoding/transmission of information in an OFDM system is enhanced by using complementary codes. The complementary codes, more particularly, are converted into phase vectors and the resulting phase vectors are then used to modulate respective carrier signals. The modulated result is then transmitted to a receiver which decodes the received signals to recover the encoded information.

Isaksson, et al. U.S. Pat. No. 5,812,523, discloses a method and device for synchronization at OFDM-system.

A method of demultiplexing OFDM signals and a receiver for such signals.

The method is concerned with synchronization in an OFDM receiver. A signal is read into a synchronization unit, in the time domain, i.e., before Fourier transforming the signal by means of an FFT processor. In the synchronization unit, a frame clock is derived for triggering the start of the FFT process and for controlling the rate at which data is supplied to the FFT processor. For OFDM reception, it is vital that the FFT process commences at the right point in time. Once the frame clock has been recovered, a frequency error can be estimated by the synchronization unit. The frequency error is used to control an oscillator which generates a complex rotating vector which is, in turn, multiplied with the signal to compensate for frequency errors. The method can be used both with OFDM systems in which symbols are separated by guard spaces, and with OFDM systems in which symbols are pulse shaped.

Kim, U.S. Pat. No. 5,963,592, discloses an adaptive channel equalizer for use in digital communication system utilizing OFDM method. An adaptive channel equalizer for use in OFDM receiver is disclosed. The adaptive channel equalizer comprises a first complex multiplier for outputting a first in-phase complex multiplication signal and a first quadrature phase complex multiplication signal; a reference signal generator for generating a reference signal; an error calculator for outputting an in-phase error signal and a quadrature phase error signal; a delay unit for outputting an in-phase delay signal and a quadrature phase delay signal; a gain controller for outputting an in-phase gain control signal and a quadrature phase gain control signal;

a second complex multiplier for outputting a second in-phase complex multiplication signal and a second quadrature phase complex multiplication signal; an adder for outputting updated in-phase and quadrature phase coefficients; an address generator for generating a write address signal and a read address signal;

a storage unit for storing the updated in-phase and quadrature phase coefficients, and outputting the updated coefficients; an initial coefficients generator for generating an initial coefficients; a selecting signal generator for generating a selecting signal; and a multiplexing unit for selecting one of the initial coefficients and the updated coefficients according to the selecting signal.

Seki, et al., U.S. Pat. No. 5,694,389, discloses an OFDM transmission/reception system and transmitting/receiving apparatus. The apparatus improves the frequency acquisition range and the resistance to multipath interference. In a digital signal transmission system using OFDM, on the transmission side, some or all of a plurality of equidistant carrier positions are treated as reference carrier positions. The actual transmitted carriers are arranged in a predetermined pattern non-equidistant to the frequency carrier positions to form an OFDM symbol.

This OFDM symbol is periodically transmitted as frequency reference symbols. On the reception side, the carrier arrangement pattern of the frequency reference symbols is detected, a carrier frequency offset is detected from the detected pattern offset, and the carrier frequency is compensated based on the frequency offset.

Cimini, et al. U.S. Pat. No. 5,914,933, discloses a clustered OFDM communication system. A multicarrier communication system for wireless transmission of blocks of data having a plurality of digital data symbols in each block. The communication system includes a device for distributing the digital data symbols in each block over a plurality of clusters, each of the clusters receiving one or more digital data symbols. The digital data symbols are encoded in each of the cluster; and modulated in each cluster to produce a signal capable of being transmitted over the sub-channels associated with each cluster.

A transmitter thereafter transmits the modulated signal over the sub-channels. By distributing the modulated signal over a plurality of clusters, overall peak-to-average power (PAP) ratio is reduced during transmission and transmitter diversity is improved.

Williams, et al. U.S. Pat. No. 5,815,488, discloses a multiple user access method using OFDM. A communication method enables a plurality of remote locations to transmit data to a central location. The remote locations simultaneously share a channel and there is a high degree of immunity to channel impairments.

At each remote location, data to be transmitted is coded by translating each group of one or more bits of the data into a transform coefficient associated with a frequency in a particular subset of orthonormal baseband frequencies allocated to each remote location. The particular subset of orthonormal baseband frequencies allocated to each location is chosen from a set of orthonormal baseband frequencies. At each remote location, an electronic processor performs an inverse orthogonal transform (e.g., an inverse Fourier Transform) on the transform coefficients to obtain a block of time domain data. The time domain data is then modulated on a carrier for transmission to the central location.

Preferably, the time intervals for data transmission at the different remote locations are aligned with each other. In one embodiment of the invention, all of the baseband frequencies are allocated to a single particular remote location for one time slot. At the remote location, data is received from a plurality of remote locations. The data is demodulated to obtain baseband time domain data. The orthogonal transform is performed on this data to obtain transform coefficients. Each transform coefficient is associated with a baseband frequency. The central location keeps track of which baseband frequencies are allocated to which remote location for subsequent translation of each transform coefficient.

Isaksson, U.S. Pat. No. 5,726,973, discloses a method and arrangement for synchronization in OFDM modulation. A method and an arrangement for synchronization in OFDM modulation. Frequency errors of an IF clock and a sampling clock are controlled by estimating the deviation of the sampling clock and, respectively, the IF clock for two subcarriers with different frequencies.

According to the invention, the frequencies are chosen symmetrically around zero and the absolute phase errors are detected for both subcarriers.

Timing errors and phase errors are formed from the absolute phase errors in order to generate two control signals. The first control signal is formed from the deviation of the sampling clock and the timing error for controlling the sampling clock while the second control signal is formed from the deviation of the IF clock and the phase error for controlling the IF clock.

Wright, U.S. Pat. No. 5,838,734, discloses means for compensation for local oscillator errors in an OFDM receiver. A receiver for orthogonal frequency division multiplexed signals includes means for calculating the (discrete) Fourier Transform of the received signal, and means for calculating the phase error due to local oscillator errors.

McGibney, U.S. Pat. No. 5,889,759, discloses an OFDM timing and frequency recovery system. A synchronizing apparatus for a differential OFDM receiver that simultaneously adjust the radio frequency and sample clock frequency using a voltage controlled crystal oscillator to generate a common reference frequency. Timing errors are found by constellation rotation.

Subcarrier signals are weighted by using complex multiplication to find the phase differentials and then the timing errors. The reference oscillator is adjusted using the timing errors. Slow frequency drift may be compensated using an integral of the timing error. Frequency offset is found using the time required for the timing offset to drift from one value to another.

Background material on advanced modulation techniques and related communication topics may be found in the following articles:

Scott L. Miller and Robert j. O'Dea, "Peak Power and Bandwidth Efficient Linear Modulation", IEEE transactions on communications, Vol. 46, No. 12, pp. 1639–1648, December 1998.

Kazuki Maeda and Kuniaki Utsumi, "Bit-Error of M-QAM Signal and its Analysis Model for Composite Distortions in AM/QAM Hybrid Transmission", IEEE transactions on communications, Vol. 47, No. 8, pp. 1173–1180, August 1999.

Kazuki Maeda and Kuniaki Utsumi, "Performance of Reduced-Bandwidth 16QAM with Decision-Feedback Equalization", IEEE transactions on communications, Vol. COM-35, No. 7, pp. 1173–1180, July 1987.

Background material on phase noise in advanced communication systems may be found in the following references:

Yossi Segal and Zion Hadad, "OFDMA access method for HIPERACESS", HARNC1.doc, December 1999.

Naftali Chayat, "Updated Submission Template for TGa—Revision 2", IEEE 802.11-98/156r2, March 1998.

Alcatel, Bosch, Ericsson, Lucent, Nokia, Siemens AG and Siemens ICN, "Proposal for the Adoption of the TDMA Access Scheme in HIPERACCESS", HA16ERI1a.doc, December 1999.

Thierry Pollet, Mark Van Bladel and Marc Moeneclaey, "BER Sensitivity of OFDM Systems to Carrier Frequency Offset and Wiener Phase Noise", IEEE transactions on communications, Vol. 43, No. 2/3/4, pp. 191–193, February/March/April 1995.

Luciano Tomba, "On the Effect of Wiener Phase Noise in OFDM Systems", IEEE transactions on communications, Vol. 46, No. 5,pp. 580–583, May 1998.

Naftali Chayat, "TGa Comparison Matrix per 98/156r2", IEEE 802.11-98/157r5, May 1998.

ETSI EP BRAN #16 Athens, Greece Nov. 29 —Dec. 3, 1999 HA16RNC1Annex.doc page 3 of 13 22-Nov-99

SUMMARY OF THE INVENTION

The present disclosure relates to improvements in OFDM-based digital communications. The scope and spirit of the invention are better described with the inclusion of specific applications thereof.

A possible problem in the above modulation scheme may be an error in the time synchronization between several signals appearing at the receiver, or between transmitter and receiver.

When there is a time synchronization error, the signals after FFT in the various subchannels are rotated with respect to each other. This effect creates interference within the subchannel.

One application of the invention relates to receiver synchronization using means for Automatic Synchronization Control (ASC).

The ASC means use an analysis of pilot signals in the transmitted signal to implement the ASC loop.

The analysis is performed continuously, in real time. The correction of detected errors is also performed continuously in real time.

The time synchronization error may be evaluated based on the rate of rotation of the pilot signals. A correction signal is generated accordingly, to adjust the timing in the receiver to the received signal. This is implemented in an ASC loop, to achieve optimal timing for sampling in the A/D converter.

Another problem is a frequency error between the transmitted signal and the receiver.

A frequency error generates a frequency shift that may change the location of symbols and/or may generate interference between symbols. The information may be divided between separate bins, or may be assigned to other than the desired bins. Some information may be lost because of the frequency shift. The actual effect in each case (or at any instant in time) depends on the measure of frequency deviation.

Real-time means are used to measure the frequency error and correct for it in an Automatic Frequency Control (AFC) loop.

A correction signal is generated accordingly, to correctly tune the receiver to the received signal.

Thus, the system will adapt to varying channel characteristics in real time, to achieve improved communications.

This may be useful in DVB-T, for example, where there are a large number of pilot signals available.

The frequency resulting from the AFC loop is used as a clock for the receiver and subsequently for the transmitter. A frequency error may stem from two possible causes:

A. an undesired difference between the receiver LO (local oscillator) and the transmit LO.

B. a frequency Doppler shift because of the movement of the mobile subscriber.

This effect, together with means for its correction using a dual loop AFC, are detailed elsewhere in the present disclosure.

A second application relates to a channel sounder. Using means for analyzing the received pilot signals, a signal processor can characterize the communication channel. Using the pilots rather than the information or noise in the channel may achieve a better performance system.

The phase and amplitude of the pilots is measured to evaluate the channel distortion at different frequencies. The results are used to apply a correction to the received signal whose subcarriers are located between the pilot signals.

In one embodiment, the average distortion of two adjacent pilots is used to correct the information between these pilots. When the distortion in each pilot is different, the correction may be in error.

A better correction may be achieved using an interpolation process to correct for phase and amplitude of received signals between any two adjacent pilots. This corrects the distortion of the signal frequency spectrum, to improve the receiver performance.

Interpolation may be used to arrive at a channel estimate for each channel frequency, and to correct the signal accordingly. The correction is made in the complex domain, to include gain and phase corrections. Interpolation may be implemented either in the time domain or the frequency domain.

For example, interpolation may be implemented using a low pass filter or a FIR or convolver.

Multipath may interfere with reception of wideband signals. It may cause several replicas of a signal to be received, each possibly having a different time delay, amplitude and polarity. These signals may result in interference between adjacent transmitted frames.

A method and system for addressing the multipath problem may include processing in the frequency domain. Thus, the pilots spectrum is extracted using FFT for example. Multipath may cause undesired changes in the amplitude and phase in the pilots, which are correlated from one spectral line to the other. These changes are responsive to the time delay in each multipath signal.

Using signal processing applied to the spectral picture (the pilots representation in the frequency domain), each pilot signal can be reconstructed. The changes in the pilots are indicative of the multipath effects in the channel. The information thus derived may be used to correct for multipath. Thus, the interference because of multipath is reduced.

Moreover, multipath signals may be added to the main path signal, to actually increase the signal power to improve the signal to noise ratio.

Multipath attenuation or cancellation may be achieved using the measured characteristics of the channel. Multipath can be corrected for by using an equalizer or transversal filter. The parameters for the equalizer are derived from the measured channel characteristics. For each detected multipath, the filter will generate a correcting signal of the proper time delay, amplitude and polarity.

The equalizer parameters may be computed in the frequency domain, followed with an IFFT. These parameters may be applied to a transversal filter.

The above system and method may be advantageously used in the physical layer specification proposed as BRAN-HA/PHY, for example. Superior performance may be achieved at lower phase noise.

Further objects, advantages and other features of the present invention will become obvious to those skilled in the art upon reading the disclosure set forth hereinafter.

DETAILED DESCRIPTION OF THE PREFERRED EMBODIMENTS

Figure 1:
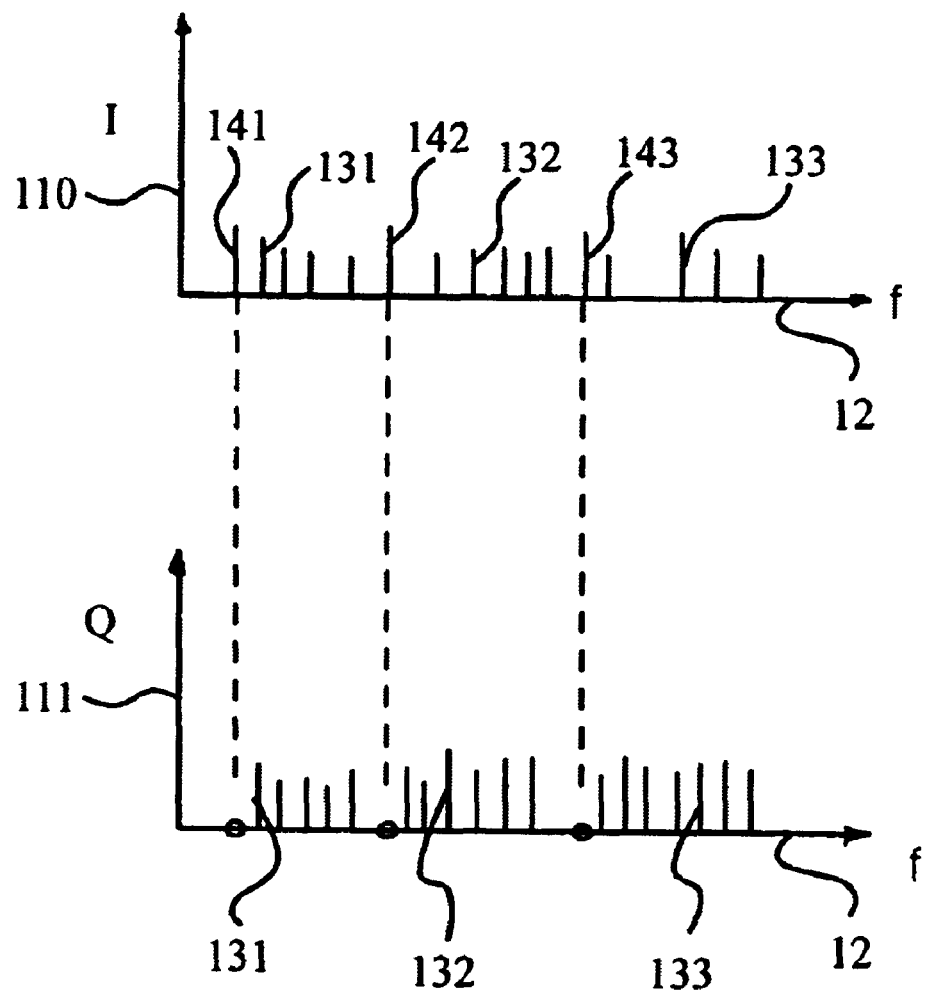
FIG. 1 illustrates the spectrum of an OFDM signal, with pilots and data.

A preferred embodiment of the present invention will now be described by way of example and with reference to the accompanying drawings. FIG. 1 illustrates the spectrum of an OFDM signal, including pilots and data in the complex frequency domain, with amplitude axis (I) 110, amplitude axis (Q) 111 and frequency axis 12. The spectrum includes the spectrum of data, for example 131, 132, 133 and the pilots 141, 142, 143.

It is assumed that the transmitted signal includes pilots of equal amplitude and being in phase. Furthermore, the pilots are equidistant in the frequency domain. These properties are used in the present invention, as detailed below. The properties of the pilots are measured and deviations from the transmitted signal are indicative of distortions in the communication channel. The measured distortion are used to compute the correction parameters for the channel.

Figure 2:
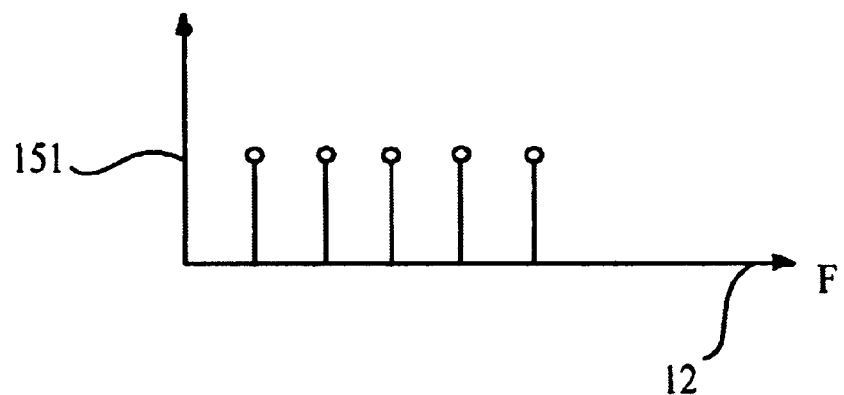
FIG. 2 illustrates the phase of the pilots versus frequency.
Figure 2:
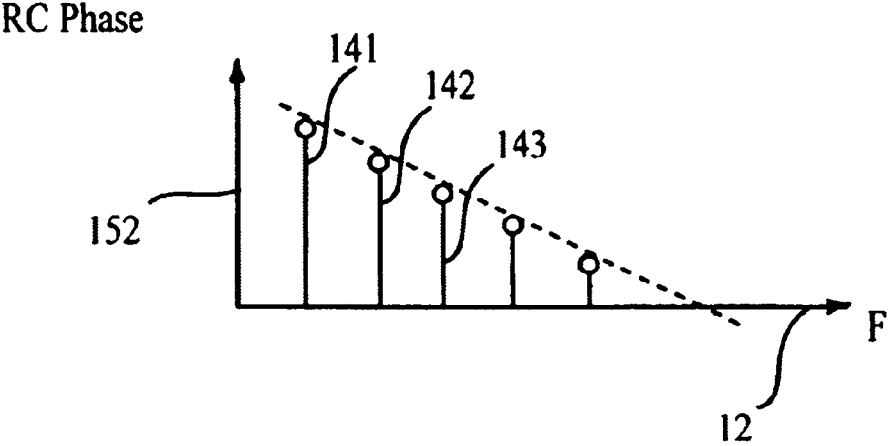

FIG. 2 illustrates a possible distortion in the phase of the pilots versus frequency.

The graph indicates an example of phase shift in the frequency domain, with transmit phase axis 151, receive phase axis 152 and frequency axis 12. The transmit pilots 151 are all in phase. A time difference may cause a phase shift in the received pilots 152, as illustrated with the phase of the pilots 141, 142, 143. Such a linear change in the phase of pilots may be caused by a time error in sampling in the receiver. The slope of the graph is indicative of the time error.

This may be used in a receiver to correct for synchronization errors.

Figure 3:
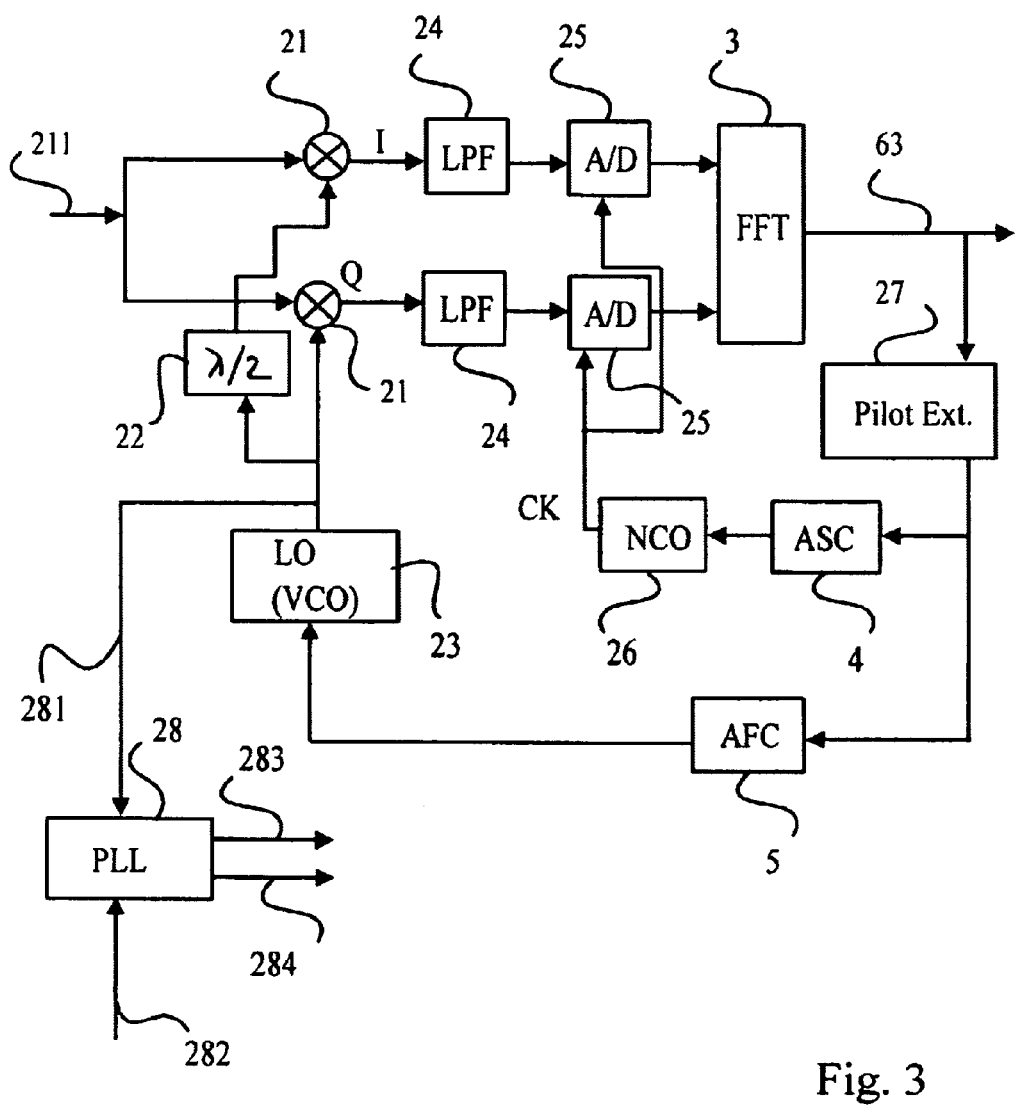
FIG. 3 details the block diagram of a system for implementing ASC and AFC.

FIG. 3 details the block diagram of a system for implementing ASC and AFC. The intermediate frequency (IF) input channel 211 is transferred to a couple of mixers 21 for quadrature coherent detection. A delay unit (90 degrees) 22 is used to generate the quadrature reference from a local oscillator (LO) 23.

The LO 23 may be implemented, for example, using a voltage controlled oscillator (VCO). The detected signals (I,Q) are processed in a pair of low pass filters (LPF) 24 and are converted to digital words in analog to digital converters (ADC) 25.

The input wideband signal 211 (time domain), after being transformed into digital form, is applied to an FFT processor 3. The FFT processor generates the transformed signal 63 (frequency domain).

Signal 63 may include data spectrum and pilots, as illustrated in FIG. 1 or 2. A pilots extraction unit 27 extracts the pilots from the signal 63.

The system further includes a Phase Lock Loop (PLL) 28, having a first input 281 from the LO 23 and a second input 282, and two outputs 283, 284.

The ASC unit 4 detects the slope of the phase of pilots as illustrated in FIG. 2 and computes therefrom the synchronization error.

A corrected timing signal is applied to a numerically controlled oscillator (NCO) 26. NCO 26 generates the clock for the ADC 25. Thus, the timing of the sampling of the analog signals is adjusted responsive to the measured timing error. This will correct the timing or synchronization error in the receiver.

Various embodiments of the invention may be implemented. For example, sample and hold means (not shown) before the ADC 25 may be used to correct for synchronization errors.

Thus, automatic synchronization control is achieved, wherein ASC unit 4 measures, in real time, the synchronization error and closes a loop to correct it. The synchronization may have to change during a communications session. The above loop will change the synchronization as required, to achieve a system that is adaptive to changing channel conditions.

The ASC is performed automatically and without interfering with the actual communications—no additional synchronization signals are added and no other changes are required in the transmitted signals.

Thus, a possible error in the time synchronization between signals will be corrected. The reduction or elimination of time synchronization errors will keep the signals in the various channels orthogonal to each other, as they should be.

This may reduce or eliminate a cause of interference between channels.

Thus, the system will adapt to varying channel characteristics in real time, to achieve improved communications.

Another problem is a frequency error between the transmitted signal and the receiver. A frequency error generates a time-varying phase error, to result in a rotation of the pilot signals of FIG. 2. Thus, for a frequency error the slope of the pilots will continuously change at a specific rate.

The system may detect such a change in the slope of pilots phase and may compute therefrom the frequency error in the receiver. This function is implemented in the AFC unit 5, As a frequency error is detected, AFC unit 5 will issue a correction signal to VCO 23.

Thus, automatic frequency control is achieved, wherein AFC unit 5 measures, in real time, the frequency error and closes a loop to correct it. The received frequency may change during a communications session. The above loop will tune the VCO 23 as required, to achieve a system that is adaptive to changing channel conditions.

Real-time means are used for AFC. The frequency error is evaluated based on the rate of rotation of the pilot signals. A correction signal is generated accordingly, to correctly tune the receiver to the received signal.

The AFC is performed automatically and without interfering with the actual communications—no additional synchronization signals are added and no other changes are required in the transmitted signals.

The above AFC and ASC systems and methods may be useful in wideband signals like DVB-T, for example, where there are a large number of pilot signals available.

Figure 4A:
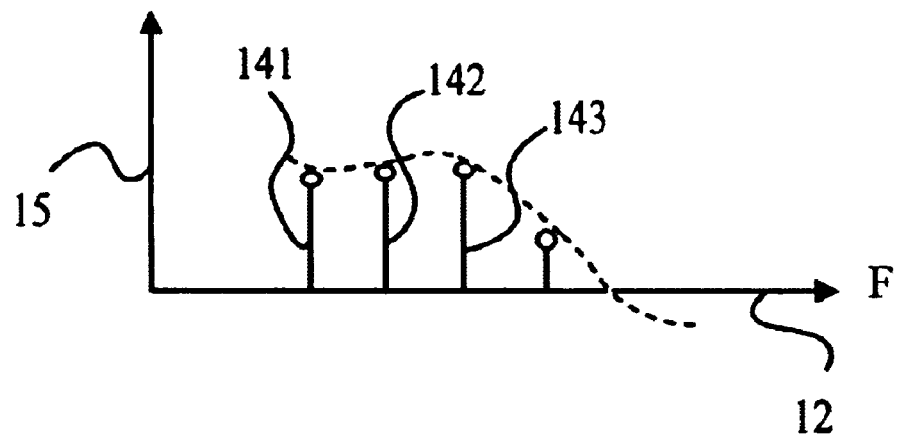
FIG. 4A illustrates the phase distortion of pilots in a communication multipath channel.

FIG. 4A illustrates the phase distortion of pilots in a communication channel. Whereas FIG. 2 illustrated a phase distortion due to a timing delay only, an actual channel may cause a more complex distortion, where the phase differences between pilots does not change in a linear fashion.

Moreover, the amplitude of the pilots may change as well. That is, for each frequency the channel introduces a distortion characterized by an amplitude and phase change in the signal. This channel effect causes a distortion in the transmitted signal and may reduce the performance of the communication system.

This channel effect is illustrated in the frequency domain, with phase axis 15 and frequency axis 12, with pilots 141, 142, 143 each possibly having a different phase.

Figure 4B:
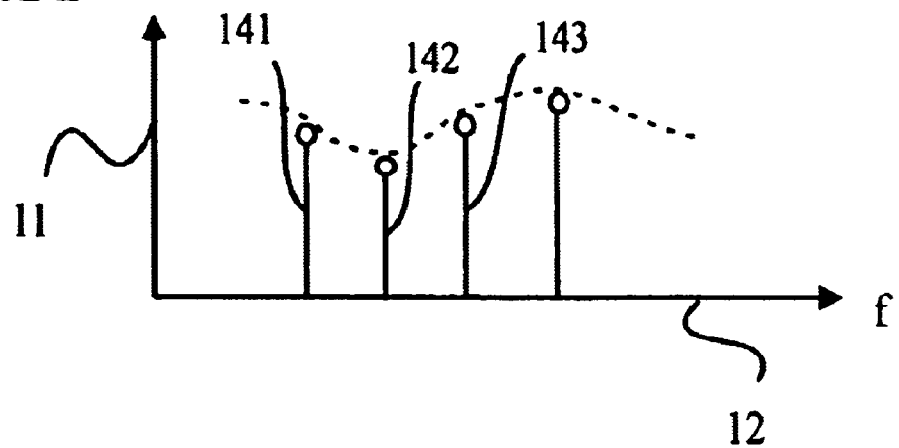
FIG. 4B illustrates the amplitude distortion of the pilots.

The other distortion effect is shown in FIG. 4B, that illustrates the amplitude distortion of the pilots, with amplitude axis 11 and frequency axis 12 and pilots 141, 142, 143 of possibly a different amplitude each.

Method for Channel Distortion Correction

The following method may be used to correct for phase and amplitude distortion in the channel:

A. measuring the phase of each pilot in a receiver. Measuring the amplitude of each pilot as well.

B. computing a correction factor for each pilot, to bring all the pilots in phase and to an equal amplitude. The correction factors have a phase shift component and a gain component.

C. applying the correction factors to the received signals. Between each two adjacent pilots, the correction factor may be the average of the factors for these two pilots. Alternately, separate correction factors may be computed for each frequency using an interpolation method. This may allow to correct each frequency (or each output of the FFT) with its individually computed, corresponding correction factor.

D. repeating steps A–C all the time, to measure the channel characteristics in real time and to correct in real time for changing channel properties.

End of method.

Preferably, the above method is implemented after achieving good frequency lock and synchronization in the receiver. Then, phase rotation or linear phase change effects are removed and only remains the distortion caused by the channel to correct.

Figure 5:
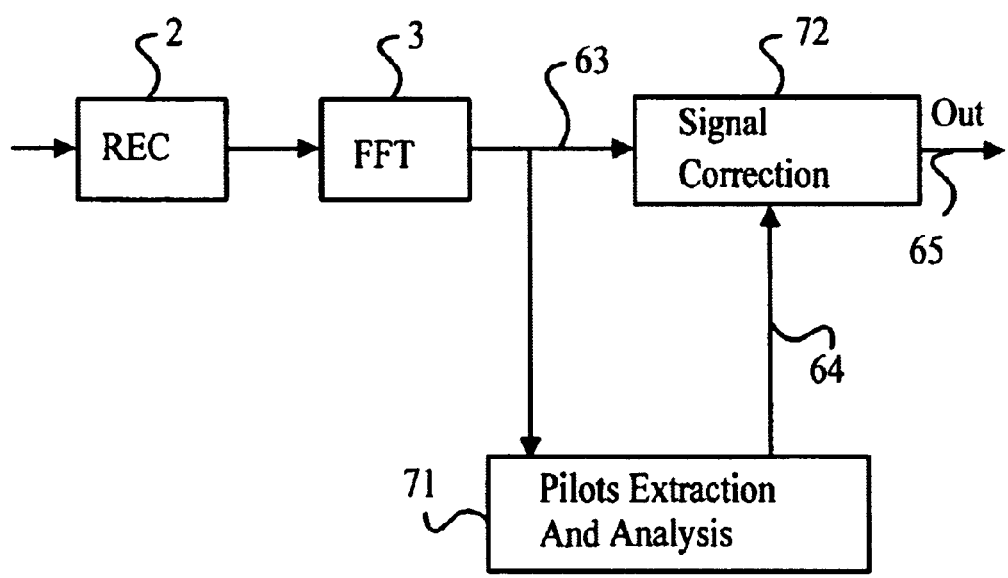
FIG. 5 details a block diagram of a system for correcting the phase and amplitude distortion of signals in a communication channel.

FIG. 5 details a block diagram of a system for correcting the phase and amplitude distortion of signals in a communication channel.

This system may be used to implement the method detailed above for correction of the phase and amplitude distortion in the channel.

A receiver 2 may receive and detect a signal, that is transferred to the FFT processor 3 for computing the spectrum of the signal. The signal in the frequency domain is transferred to a pilots extraction and analysis unit 71.

The unit 71 includes means for:

A. extracting the pilots from the received signals

B. analyzing the pilots to detect distortion in phase or amplitude, as detailed above. These distortions are indicative of the distortion in the communication channel.

C. computing the complex correction coefficients for the various frequencies in the signal, using information derived from pilots in step (B) above. A possible method may use interpolation. Averaging of adjacent pilots or other methods may be used as well.

D. applying the correction coefficients, as correction signals 64 (phase and amplitude), to the signal correction unit 72.

The transformed signal 63 (frequency domain) is transferred to unit 72, where the correction coefficients are applied to correct it.

This results in the corrected signal 65 (frequency domain) out of unit 72.

The above system and method may be used to implement a channel sounder. Using means for analyzing the received pilot signals, a signal processor can characterize the communication channel.

The phase and amplitude of the pilots is measured to evaluate the channel distortion at different frequencies. The results are used to correct the received signal accordingly. Interpolation may be used to correct for phase and amplitude of received signals between any two adjacent pilots.

This system and method corrects the distortion of the signal frequency spectrum, to improve the receiver performance.

Figure 6:
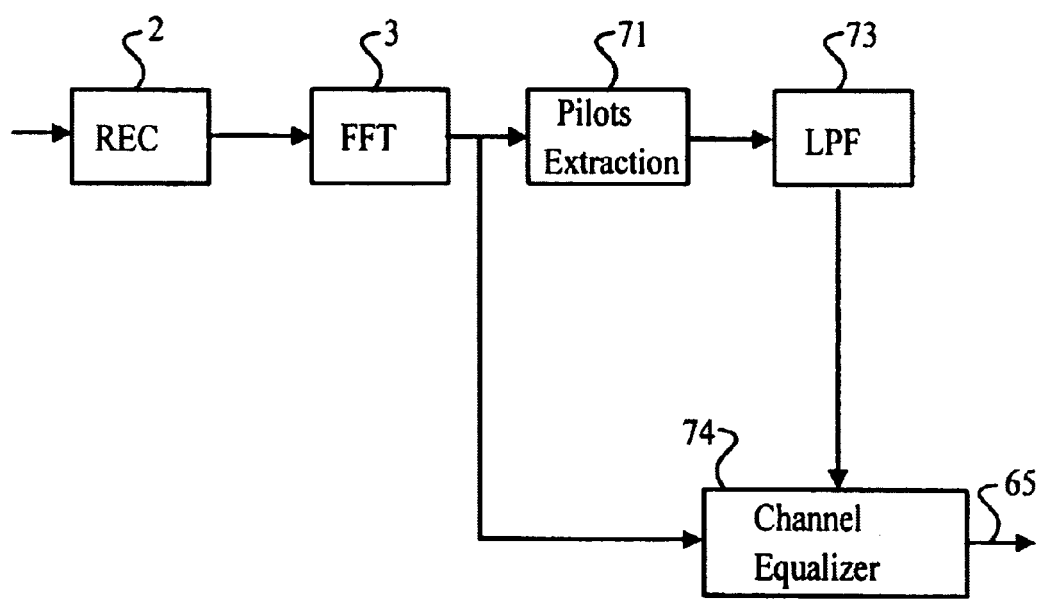
FIG. 6 details a block diagram of a system for correcting the multipath distortion of signals using a LPF.

FIG. 6 details a block diagram of a system for correcting the multipath distortion of signals using a Low Pass Filter LPF.

The system includes a receiver 2 for a received signal. The input wideband signal (time domain) from receiver 2 is transferred to an FFT processor 3, that generates a transformed signal in the frequency domain. This signal is transferred to a pilots extraction and analysis unit 71, that extracts the pilots from the received signal. A Low Pass Filter (LPF) 73 is used to measure the multipath, applying a time-domain processing to the pilots spectrum that is presented to the LPF as a time-varying signal. Multipath causes changes in the pilots, that are detected in the LPF.

The resulting multipath information is applied to a channel equalizer 74. The channel equalizer 74 also receives the received signal (in frequency domain) from the FFT processor 3. Unit 74 then corrects the received signal for multipath. The corrected signal 65 (frequency domain) is the output of the system.

The above system may be used to correct for multipath, that may interfere with the reception of wideband signals. It may cause several replicas of a signal to be received, each possibly having a different time delay, amplitude and polarity. These signals may result in interference between adjacent transmitted frames.

The LPF as detailed is one possible embodiment of means for time filtering in the frequency domain. The LPF is applied to the spectral picture (the pilots representation in the frequency domain), so that each pilot signal can be reconstructed. Multipath signals are added to the main path signal, to actually increase the signal power to improve the signal to noise ratio. Furthermore, the interference because of multipath is reduced.

Figure 7:
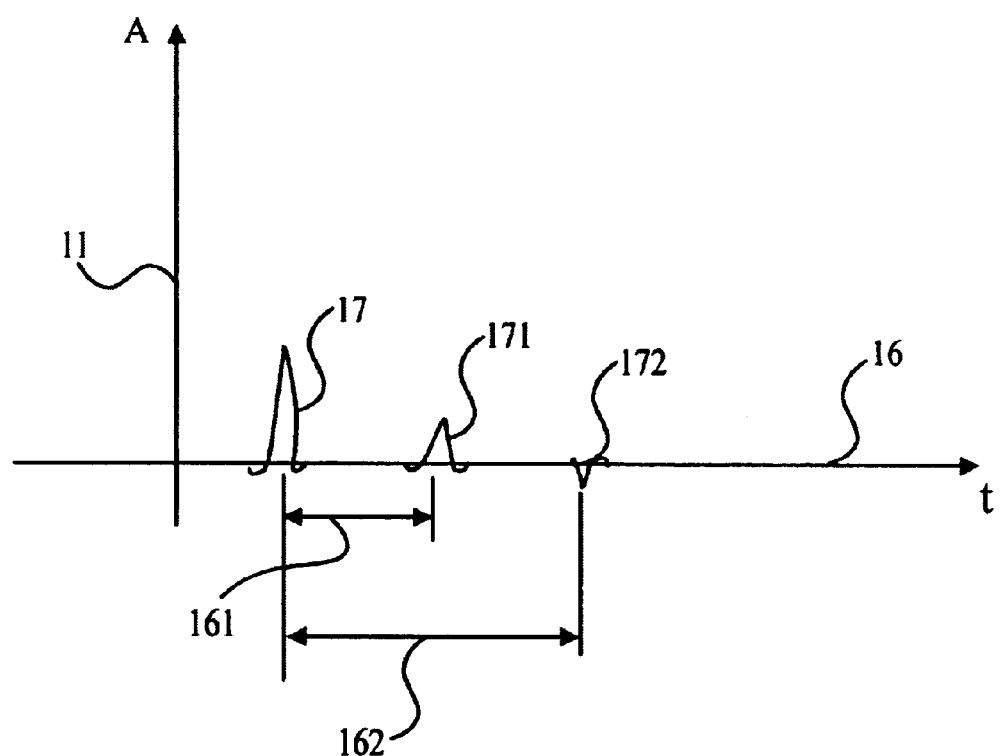
FIG. 7 illustrates the multipath effect on the pilots in the time domain.

FIG. 7 illustrates the multipath effect on the pilots in the time domain, with amplitude axis 11 and time axis 16. The signal illustrated is one example of multipath. The pilots are extracted from the signal and combined in the time domain. A pulse train in the frequency domain will result in a pulse in the time domain, this is the pilots pulse 17.

If there is multipath, it will result in a pulse with a specific delay, according to the time delay of the multipath channel in the communication path. Thus, for example, the channel may have a first multipath pulse 171 and second multipath pulse 172, having a time delay 161 and 162, respectively.

Figure 8:
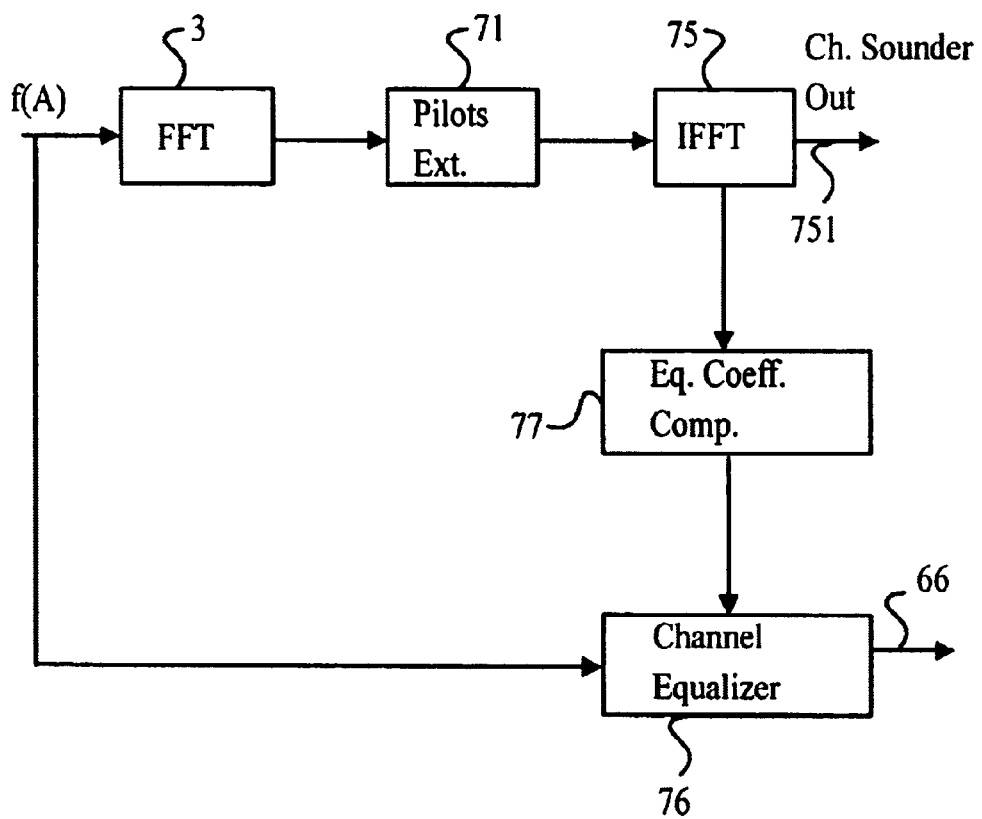
FIG. 8 details a block diagram of a system for correcting the multipath distortion of signals using means for pilots analysis.

FIG. 8 details a block diagram of a system for correcting the multipath distortion of signals using means for pilots analysis.

The system may use the above detailed multipath effect, as detailed with reference to FIG. 7.

An FFT processor 3 computes the spectrum of the received signals, that is transferred to unit 71. The pilots extraction and analysis unit 71 extracts only the pilots in the received signal. The pilots data undergoes an inverse FFT in IFFT unit 75. The output 751 of unit 75 may have the shape illustrated in FIG. 7, that is each multipath path results in a pulse with a characteristic amplitude, time delay and polarity. Output 751 comprises the channel sounder output of the system.

The information regarding each multipath is applied to an equalizer coefficients calculation unit 77.

Unit 77 computes the coefficients to be used in channel equalizer unit 76, responsive to the measured channel information from the channel sounder. The computed coefficients are transferred to unit 76.

The unit 76 operates in the time domain to add or subtract each signal from multipath, to result in a corrected signal 66 (time domain).

Thus, multipath attenuation or cancellation is achieved using the measured characteristics of the channel.

Multipath can be corrected by using an equalizer or transversal filter. For each detected multipath, the filter will generate a correcting signal of the proper time delay, amplitude and polarity.

As multipath is corrected, two benefits may be achieved: a signal with no multipath or reduced multipath may result in improved communications; and, since now the multipath signal is added in phase, it may actually increase the power of the received signal, to improve the signal to noise ratio in the system.

Figure 9:
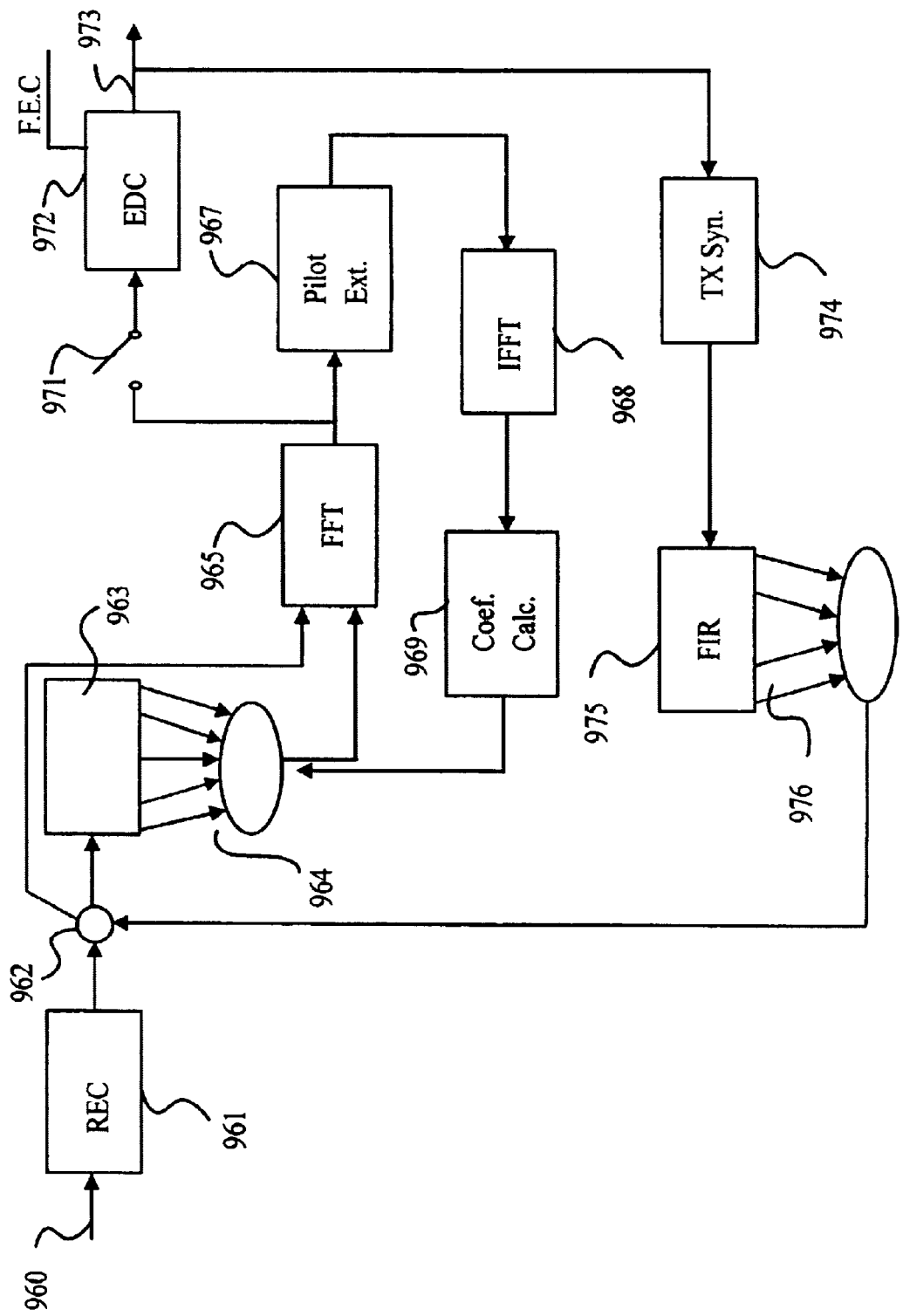
FIG. 9 details a block diagram of a decision feedback equalizer system.

FIG. 9 details a block diagram of a decision feedback equalizer system (DFE).

The system implements a multi-stage equalization and error correction method to be detailed below.

An input (baseband) 960 is connected to a recording unit 961. This allows the same frame to be played several times into the processing system. This allows for a simpler, lower cost implementation. Otherwise, separate units may be used for the various processing stages, and the unit 961 may not be required in that case.

A combiner 962 combines the input signal from unit 961 with feedback signals from a processor, that may be implemented with FIR 975 and combiner 976.

A FIR 963 filters the input signals, together with a FIR combiner/bypass unit 964.

An equalizer coefficients calculation unit 969 provides the coefficients for the FIR. Alternately, only the middle tap of the FIR is output to the FFT 965. To this effect, unit 969 sets all the FIR coefficients to zero, except the middle tap, that is set to 1 or other nonzero value.

After the FFT in unit 965, the signal is transferred to pilot extraction unit 967. This is followed by IFFT 968 and the equalizer coefficients calculation unit 969, based on the pilots values in the time domain.

A switch 971 allows to transfer the equalized received signal to error detection and correction unit 972 (EDC). The output 973 is the data output of the system, after equalization and error detection and correction.

A transmit signal synthesizer 974 is used to generate a replica of the received signal with the estimated multipath, in combination with FIR 975 and combiner 976.

The resulting signal is applied to combiner 962 to remove multipath to further enhance the received signal.

Equalization and Error Correction Method

The system detailed in FIG. 9 may implement a decision feedback equalizer method comprising the following steps:

A. record a frame of received data

B. received data passes through an equalizer (FIR) that is set to bypass mode, that is all the FIR coefficients are set to zero, except the middle tap, that is set to 1 or other nonzero value. This will not filter the signal, however the delay of the FIR is taken into account.

C. perform an FFT of the received frame

D. pilots extraction

E. IFFT

F. FIR coefficients calculation and application to the FIR. Subsequent frames may be used to update the coefficients in a pipeline fashion. Thus, in future frames the step (B) will use coefficients computed for the previous frame rather than zero value coefficients.

G. the recorded frame is again applied to the system, however this time the equalizer (FIR) corrects the input data according to the measured coefficients.

H. error detection and correction

I. a replica of the transmitted signal is synthesized, based on the corrected input signal. The synthesized signal contains the measured multipath signals, that are generated in a FIR and combiner.

J. the recorded frame is again applied to the system, however this time the replica of the multipath is subtracted from the input signal.

K. error detection and correction

L. output data.

End of method.

A possible problem in wireless is a frequency error between the transmitted signal and the receiver.

The frequency resulting from the AFC loop is used as a clock for the receiver and subsequently for the transmitter. A frequency error may stem from two possible causes:

A. an undesired difference between the receiver LO (local oscillator) and the transmit LO.

B. a frequency Doppler shift because of the movement of the mobile subscriber.

This effect, together with means for its correction using a dual loop AFC, are detailed with reference to FIG. 10.

Figure 10:
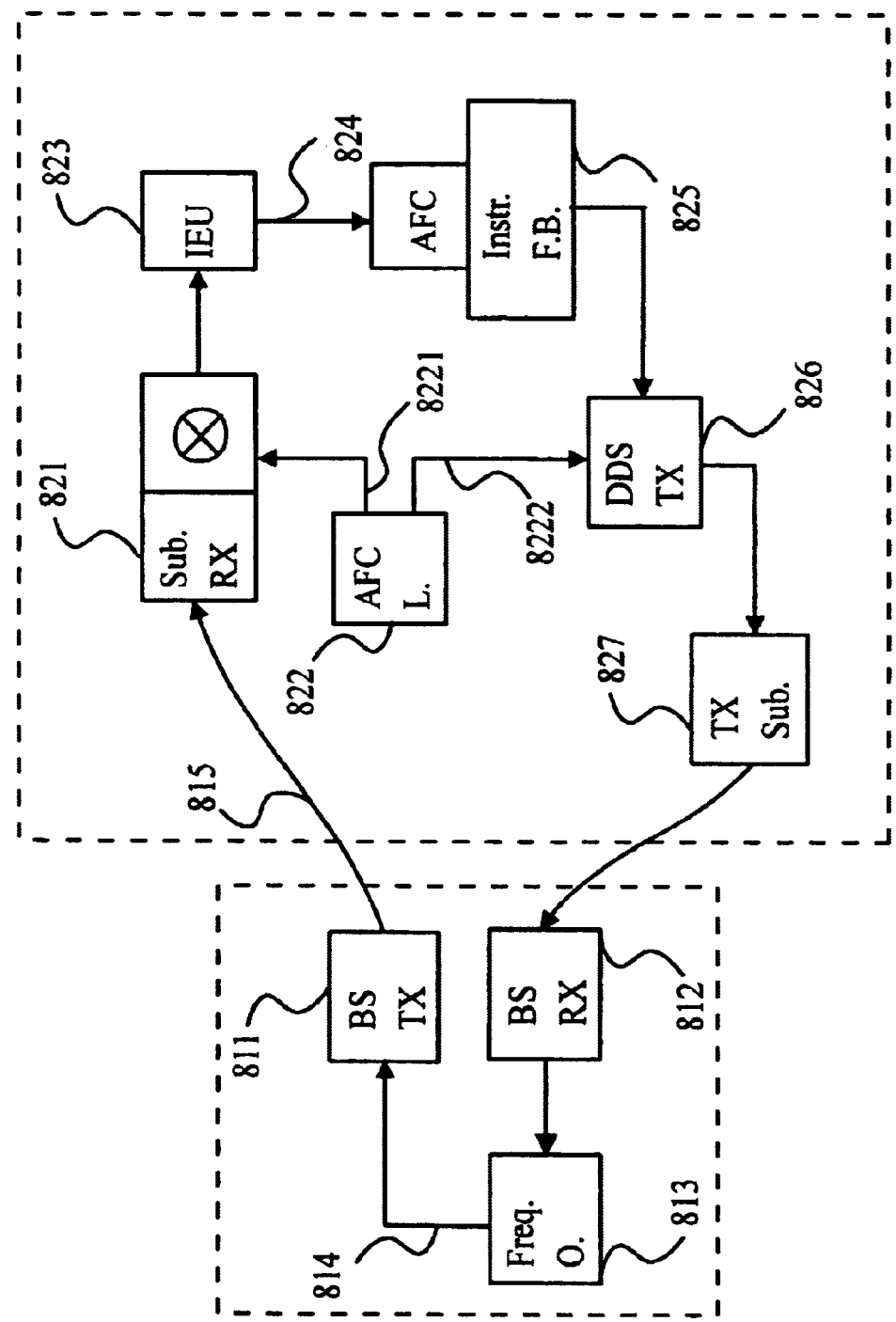
FIG. 10 illustrates a dual loop system for implementing Automatic Frequency Control (AFC).

FIG. 10 illustrates a dual loop system for implementing Automatic Frequency Control (AFC).

The system includes an inner local loop in the subscriber unit, and an outer loop implemented with components both in the subscriber unit and the base station.

The inner loop includes an AFC loop 822 connected to a subscriber receiver 821 for locking the frequency of receiver 821 to the frequency of the signal received from the base station. For example, unit 822 may lock the local oscillator to a pilot signal received from the base station. Accordingly, unit 822 generates a receiver clock 8221 for the receiver 821. Unit 822 also generates a transmitter clock 8222 that is transferred to the means for generating the transmit frequency. In the example as illustrated, the embodiment of these means is the DDS Tx 826.

The transmit frequency out of unit 826 is used in the Tx subscriber 827, that is the transmitter of the subscriber unit, for transmission to the base station.

This loop solves the problem of tuning the mobile receiver to the base station transmissions. The subscriber frequency may be in error, however, for various reasons. For example, movement of the subscriber unit may result in a Doppler frequency shift of the signal received from the base station. The receiver will lock to the shifted frequency.

The signal received at the base station will have double that frequency shift, because of the relative movement between base and mobile station.

As various subscriber units will transmit with a frequency error, the receiver in the base may have difficulty in effectively separating these receptions.

To solve these frequency errors, a second (outer) loop is added, wherein the base stations measures the frequency deviations of each subscriber and issues instructions to each subscriber to correct its transmit frequency. The outer loop is implemented, in the example as illustrated in FIG. 10, as follows: The BS Rx 812 (base station receiver) receives transmissions from mobile subscribers.

Frequency offset unit 813 measures the frequency error in the received signal, that is the difference between the actual received frequency and the precise frequency that was allocated to that subscriber. The results of the measurement are transferred to a frequency correction (Up/Down) unit 814. Unit 814 generates frequency correction messages 815 that are transmitted through the BS Tx 811 (base station transmitter) to the mobile subscriber.

In the mobile unit, these messages are received in receiver 821 and are transferred to the information extraction unit 823. The decoded messages are transferred to the AFC loop closing unit 824, that controls the instruction from base application unit 825.

The reconstructed frequency control signals (frequency correction Up/down instructions) are transferred to the DDS 826.

The DDS 826 includes means for performing a frequency shift according to the instructions received from unit 825.

Thus, the frequency at the output of DDS 826 is derived from the frequency of the received signal, corrected according to instructions from the base stations.

The inner, local frequency control loop sets the frequency according to that of the received signal.

The outer frequency control loop corrects the above frequency setting according to instructions from the base station.

The DDS 826 actually forms the transmitter local oscillator. Its output is transferred to the transmitter 827.

The above system and method may be advantageously used in the physical layer specification proposed as BRAN- HA/PHY, for example. Following is a detailed description of this embodiment of the invention and its estimated performance.

It uses an OFDMA access method for the access method for BRAN-HA/PHY Following is a description of this embodiment of invention.

1. Overview

Following is a general description of a physical layer specification proposed as the BRAN-HA/PHY. In order to leverage existing technology and reduce costs this proposal uses many of the ETSI Digital Video Broadcasting (DVB) standard for terrestrial broadcasting in the downstream channel (Base Station to Subscriber Unit). In addition, this proposal includes physical elements and implementation aspects that specifically address the challenges to operating reliably in the 20–60 GHz band.

2. Duplexing Technique

The proposed physical layer is based on Frequency Division Duplexing (FDD), which provides a separate frequency assignment for the upstream and down stream channels. We can also use a modification of the OFDM modulation parameters in order to operate the system in Time Division Duplexing (TDD) or in Half Frequency Division Duplexing (H-FDD).

3. Multiple Access Method

The proposed upstream physical layer is based on the use of a combination of Time Division Multiple Access (TDMA) and Orthogonal Frequency Division Access (OFDMA). In particular, the upstream is divided into a number of "time slots" as defined by the MAC layer. Each time slot (sized to duration of one OFDM symbol) is then divided in the frequency domain into groups of sub-carriers referred to as subchannels. The MAC layer controls the assignment of subchannels and time slots (by bandwidth on demand and Data Rate on demand). This initial proposal focuses on the efficient transport of ATM cells and IP packets in the upstream and down stream channels.

4. Downstream Transport Stream and Physical Layer

The downstream physical layer uses aspects of the well-proven DVB-T physical layer. This standard uses the OFDM as its modulation technique. This standard is based on the transmission of packetized digital video corresponding to MPEG-2. In particular a transmission convergence layer can be designed to efficiently transport ATM cells and IP packets (although any frame structure can be used, the MPEG-2 is widely used today). An OFDM symbol will be divided (in the frequency domain) into groups. The first group is a group, which will be dedicated for the broadcast of MPEG-2 transport and can be used in a SFN as the broadcasting area.

The MAC layer for fast feedback or response will use another group, the last group will be allocated for dedicated channels and could carry different information in a SFN configuration. We shall indicate that the broadcasting subcarriers group shall vary as needed, if there is no need for any broadcasting all of its subcarriers group shall be used by the dedicated channels. The encoding and decoding functions for the different group types are summarized in the next block diagram, the functions for the MPEG-2 data stream and for the dedicated channels are adopted from the DVB-T standard. (FIG. 1).

Figure 11:
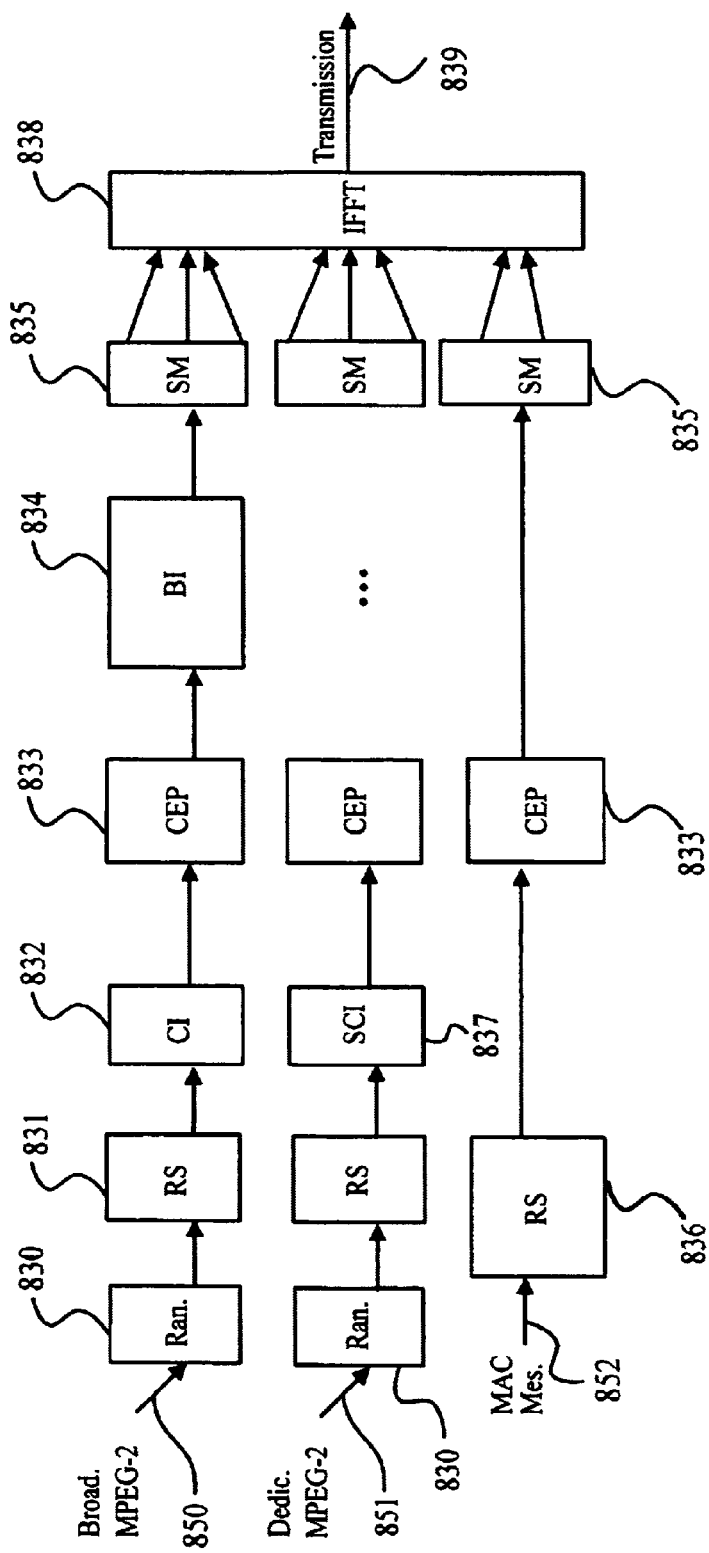
FIG. 11 illustrates a conceptual block diagram of the Downstream Encoding and Modulation subsystem.

FIG. 11 illustrates a conceptual block diagram of the Downstream Encoding and Modulation subsystem. The subsystem may be used for several channels, for example one for broadcasting MPEG-2 850, another for dedicated MPEG-2 851, and one for MAC messages 852. The processing in each channel may include a randomization unit 830, an RS coder (204,188) 831, a convolutional interleaver 832, convolutional encoding and puncturing unit 833, bit interleaver 834 and a symbol mapper 835.

The plurality of channels as illustrated (for example one for broadcasting MPEG-2 850, another for dedicated MPEG-2 851, and one for MAC messages 852) are then processed in the IFFT unit 838. The resulted signal is transmitted over transmission channel 839.

For the MAC messages 852, the processing preferably includes an RS coder (26,20) 836 and a small convolutional interleaver 837.

Figure 12:
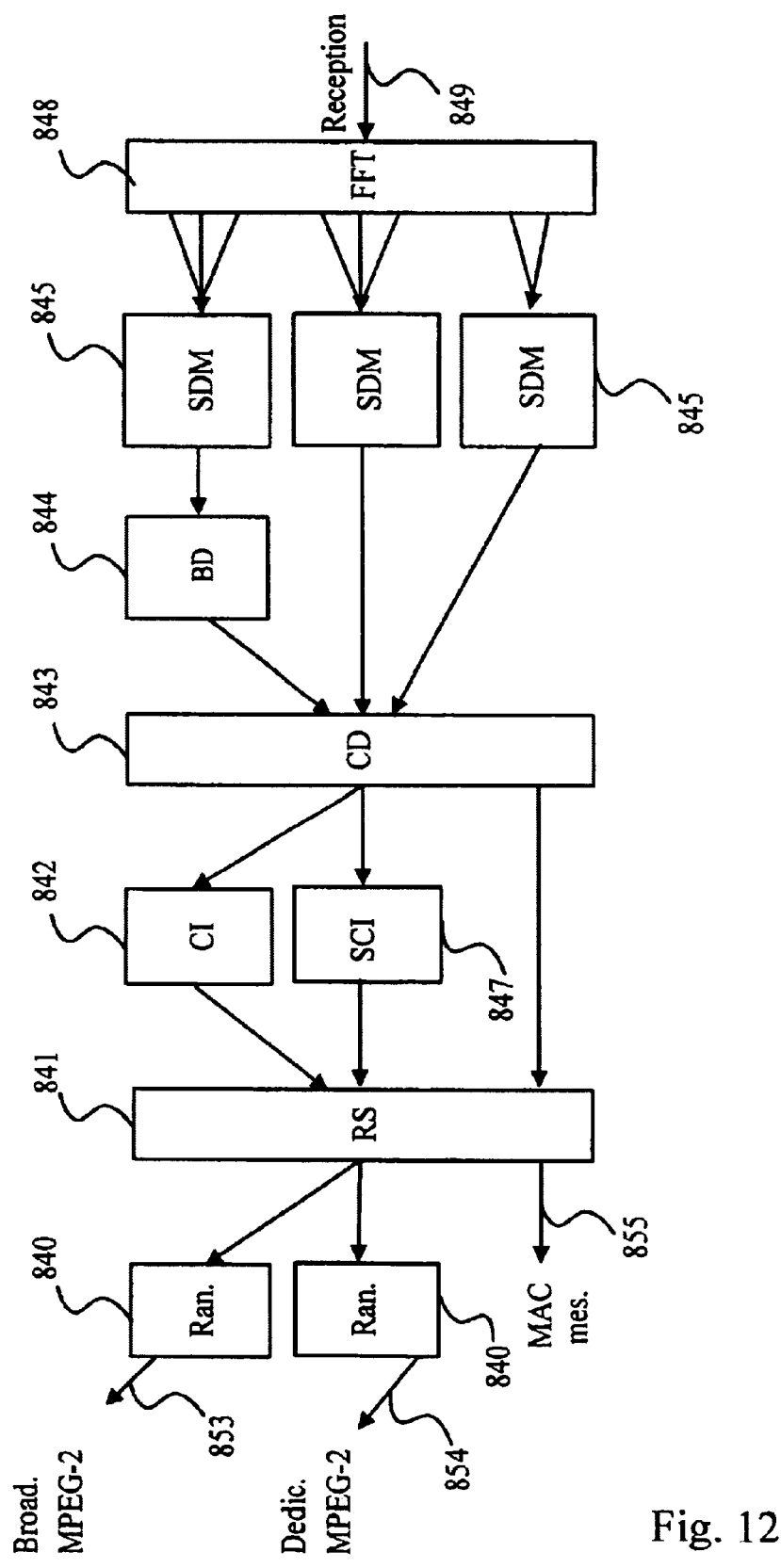
FIG. 12 illustrates a conceptual block diagram of the Downstream Demodulation and Decoding subsystem.

FIG. 12 illustrates a conceptual block diagram of the Downstream Demodulation and Decoding subsystem. The signals input over the reception channel 849 are processed in a FFT unit 848. The separate resulting data channels are each processed in a symbol demapper 845, bit deinterleaver 844, convolutional decoding unit 843, convolutional interleaver 842, RS decoder 041 and randomization unit 840.

The subsystem is devised to output the data in several channels as sent, for example one for broadcasting MPEG-2 853, another for dedicated MPEG-2 854, and one for SAC messages 855. Some of the channels may include a small convolutional interleaver 847.

The transport stream is, therefore, very robust and can be changed as a function of the protection against fading, noise and distance that should be reached.

Different modulation schemes QPSK, 16 QAM, 64 QAM and different puncturing rates $\frac{1}{2}$, $\frac{2}{3}$, $\frac{3}{4}$, $\frac{5}{6}$, $\frac{7}{8}$ enables an optimization of the Downstream bit rate and protection. Moreover at condition of LOS the guard interval needed to mitigate the multipath affects is very small, therefore a use of a small guard interval increases the channel capacity. The Guard intervals supported should then be $\frac{1}{256}$, $\frac{1}{128}$, $\frac{1}{64}$ (see calculation section). For a SFN deployment a larger Guard Interval of $\frac{1}{32}$, $\frac{1}{16}$, $\frac{1}{8}$ can be introduced.

5. Upstream Physical Layer

The upstream physical layer is also based upon OFDM modulation, the number of subchannels allocated to a specific user and the timing they will be transmitted in a specified time frame are controlled by the MAC layer. Since the upstream is TDMA/OFDMA based the channel can be modeled as a continuos sequence of "time slots" and each time slot can be modeled as a group of subchannels that are allocated to different Subscriber Units by Bandwidth On Demand. By using this technique, QoS requirements and bandwidth requirements can be managed. The recommended coding and modulation of upstream packets are summarized in the block diagram shown in FIG. 13. As shown in the diagram such a coding scheme is used in order to support a large granularity for the bandwidth on demand requirements.

Figure 13:
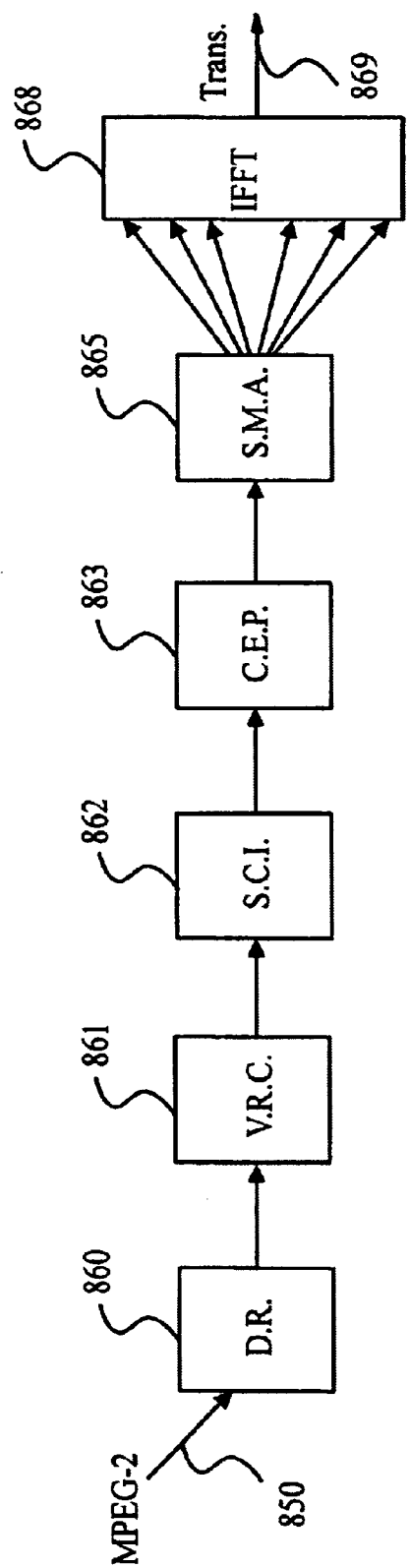
FIG. 13 illustrates a conceptual block diagram of the Upstream Encoding and Modulation subsystem.

FIG. 13 illustrates a conceptual block diagram of the Upstream Encoding and Modulation subsystem. The figure illustrates a reverse channel transmit, for example for MPEG-2 850. The signal processing includes a de-randomization unit 860, variable RS coder 861, small convolutional interleaver 862, convolutional encoding and puncturing unit 863, symbol mapper by allocation 865 and IFFT unit 868.

The resulting signals are transmitted over the transmission channel 869.

Figure 14:
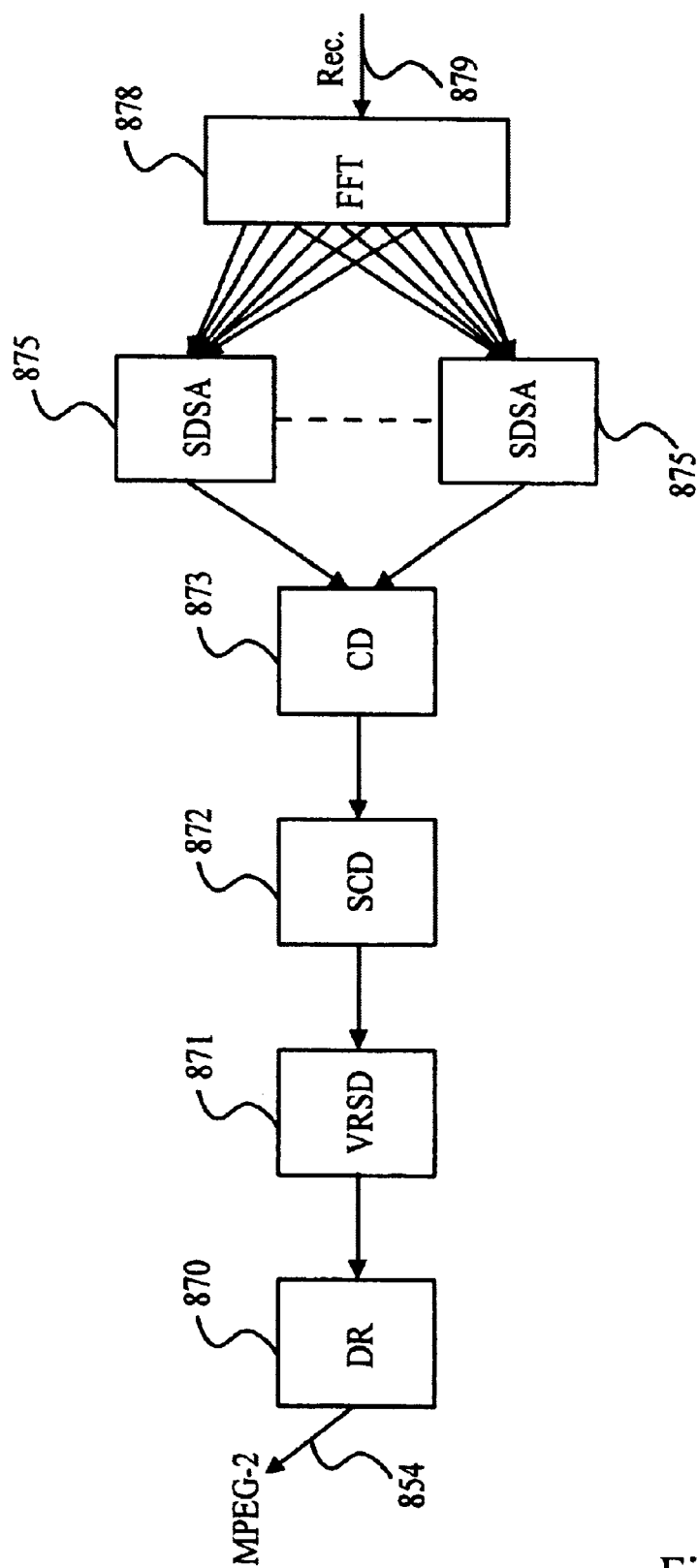
FIG. 14 illustrates a conceptual block diagram of the Upstream Demodulation and Decoding subsystem.

FIG. 14 illustrates a conceptual block diagram of the Upstream Demodulation and Decoding subsystem.

The figure illustrates an embodiment of signal processing of signals received over the reception channel 879, The signal processing includes a FFT unit 878. From the outputs of unit 878, a plurality of channels may be formed, according to the initial carrier allocation at transmission.

In each channel, the signals are processed in a symbol de-mapper by sub-channel allocation 875.

Further means for signal processing include a convolutional decoding At unit 873, small convolutional deinterleaver 872, variable RS decoder 871 and a de-randomization unit 870.

The resulting signal is transferred to output the data in MPEG-2 streaming 854 per user.

Every subchannel may consist of several carriers (see calculations part), most are used for data transmission and the rest are used for pilots transmission.

6. Physical Layer Properties

The next section deals with different aspects of the physical layer implementation.

6.1 Synchronization Technique/Timing control

In order to avoid highly accurate frequency source (e.g., OCX0) at the Subscriber Unit and satisfy timing requirements for telephony or other CBR applications (T1/E1), it is highly efficient to derive the Subscriber Unit's clocks from the Downstream transmission. This can be achieved by using the Pilots carriers transmitted by the Base Station, these Pilots can also be used in order to Synchronize onto the Downstream transmission and achieve clock extraction. Accurate upstream time slot synchronization shall be supported through a ranging calibration procedure defined by the MAC layer using the pilots transmitted by each Subscriber Unit.

Moreover, the Base Station copes with users transmission not arriving fully synchronized, and relieving the demand for users synchronization.

6.2 Frequency Control

The clock extracted from the Downstream (as explained before) is used as the reference clock of the Subscriber unit, in particular to produce the RF frequency for the transmission and to adopt this clock as the Subscriber Unit Base Band clock. Locking on the Downstream transmission frequency shall allow an accurate Upstream RF transmission frequency to be produced, that ensures that all Subscriber Units transmitting shall reach the Base Station Orthogonal, keeping the OFDM properties.

6.3 Power Control

In order to perform a Upstream power control the Base Station shall use a calibration and a periodic adjustment procedures. The adjustment values shall be sent to a Specific Subscriber Unit via the MAC layer. The Base station shall extract the adjustment values by monitoring the power on the carriers that were allocated to the specified user on the specified OFDM symbol. Controlling the power of the Downstream dedicated channels will perform another power control mechanism. The specified Subscriber Unit MAC shall send adjustment values to the base station correcting the power transmitted on the dedicated channel, and adjusting it to the demands of a certain SNR. This procedure will enable an optimized use of the base station Power Amplifier.

6.4 Crest Factor

Much research has been done on the crest factor of OFDM modulation. The maximum crest factor is derived using $10*\log(N)$, where N is the number of carriers used in the OFDM symbol. Taking into consideration that in our suggested system we use a 2048 carriers FFT/IFFT which is very similar to the "2k" mode of the DVB-T we shall introduce some measurements done on the DVB-T.

In the DVB-T, 1705 carriers are used for carriers transmission, a crest factor of 32.3 dB would be expected but in fact only 9–9.5 dB crest factor (with peaks of 10.5 dB) is actually measured in any modulation using QPSK, 16 QAM and 64 QAM. These results are achieved by the randomization of the data sent on the carriers. In comparison to a single carrier modulation using 64 QAM and a roll-off factor of 0.25–0.35 we get a crest factor of 8.8–7.8 dB, for 16 QAM we get a 1.4 dB reduction, resulting in 7.4–6.4 dB see FIG. 15.

Figure 15:
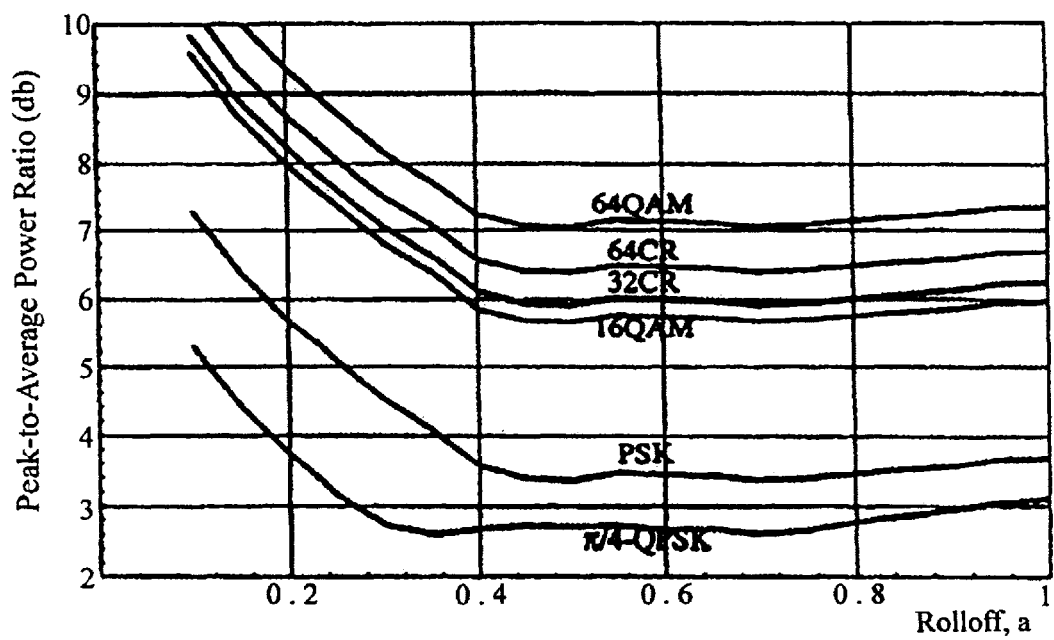
FIG. 15 details the Crest Factor versus Roll-Off Factor for Single Carrier.

FIG. 15 illustrates the Crest Factor versus Roll-Off Factor for Single Carrier.

In order to further reduce and stabilize the crest factor we can clip the signal in order to achieve a desired crest factor. The next graph plots BER/SNR for different crest factor limitations for a DVB-T 16 QAM OFDM symbol, see FIG. 16.

Figure 16:
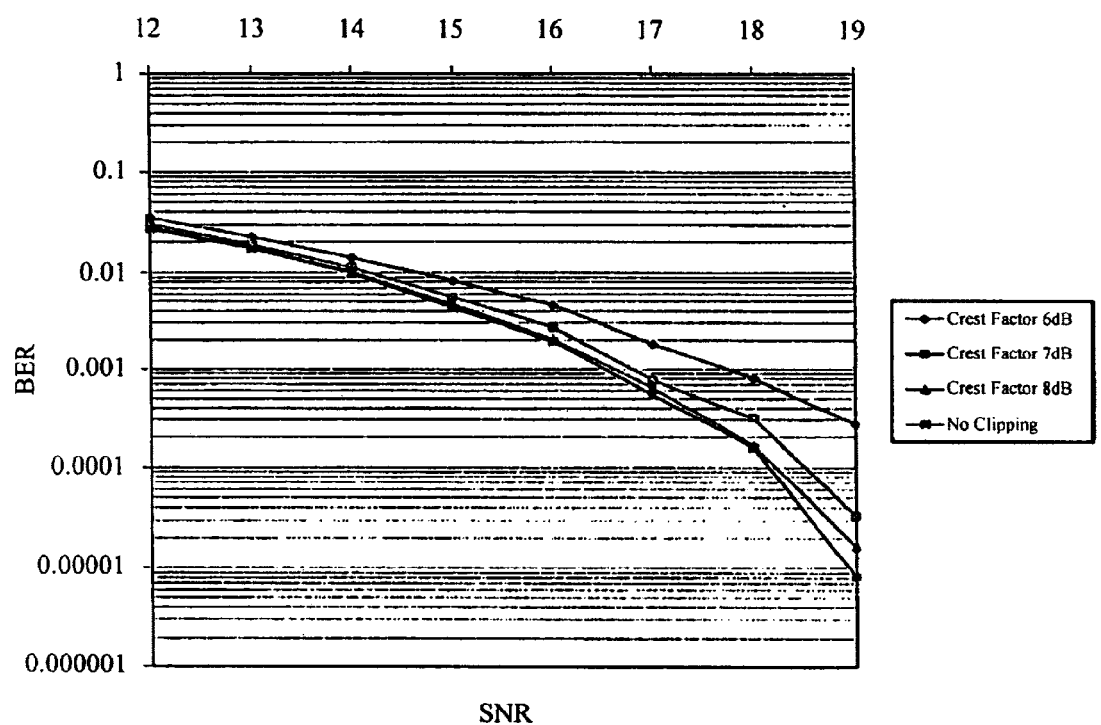
FIG. 16 details the BER/SNR for different Crest Factor values, as achieved by clipping for a DVB-T 16QAM OFDM Symbol.

FIG. 16 illustrates the BER/SNR for different Crest Factor values, as achieved by clipping for a DVB-T 16 QAM OFDM Symbol As we can notice, for a 1–1.5 dB clipping-we get no performance degradation, for a 2–2.5 dB clipping we get only about 0.5 dB degradation. For a 64 QAM modulation a degradation of 0.5 dB could be achieved when clipping 1.1–1.6 dB, therefore achieving a steady crest factor of 7.8 dB. By using more sophisticated methods, more reduction can be achieved.

For the Upstream where a reduced number of carriers are used (taking into consideration that all useful carriers are divided into 16 subchannels), the crest factor achieved is about 7–7.5 dB for QPSK, 16 QAM and 64 QAM all modulations (with peaks of 9.5 dB).

Figure 17:
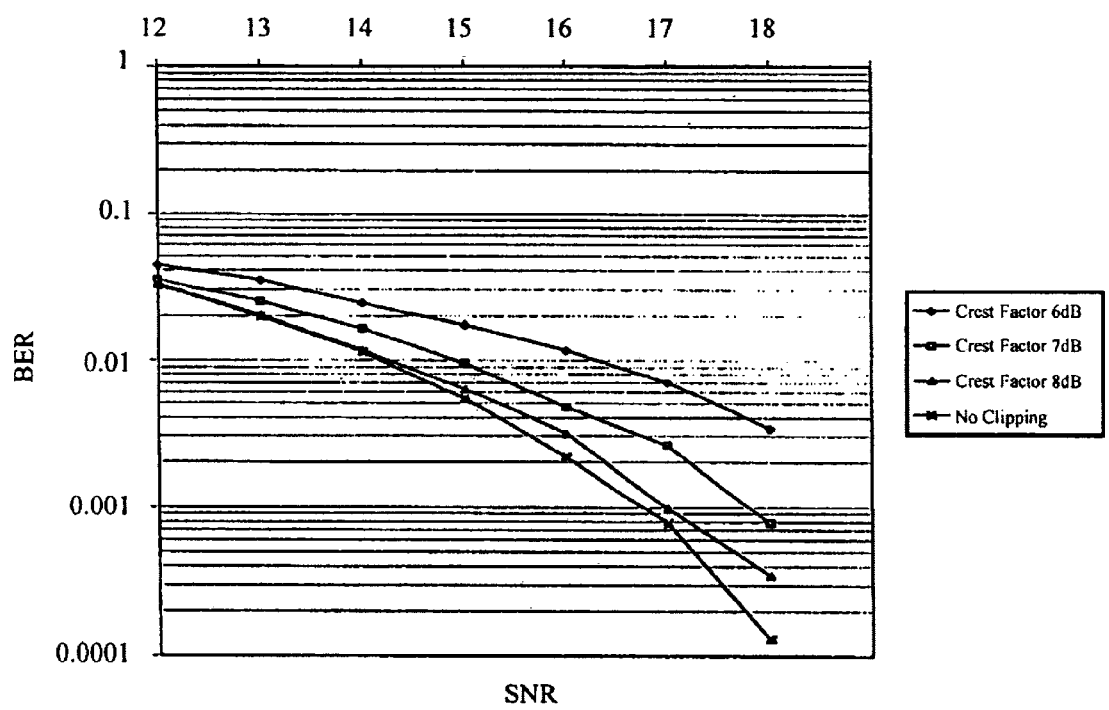
FIG. 17 details the BER/SNR for different Crest Factor achieved by clipping for an Upstream 16QAM OFDM Symbol.

Taking the same method as before, for a 16 QAM modulation clipping the power in such a way that the crest factor is 6.5 dB will introduce only about 0.2–0.4 dB degradation, see FIG. 17. By using more sophisticated methods, more reduction can be achieved.

FIG. 17 illustrates BER/SNR for different Crest Factor achieved by clipping for an Upstream 16 QAM OFDM Symbol

6.5 Spectrum Properties

Figure 18:
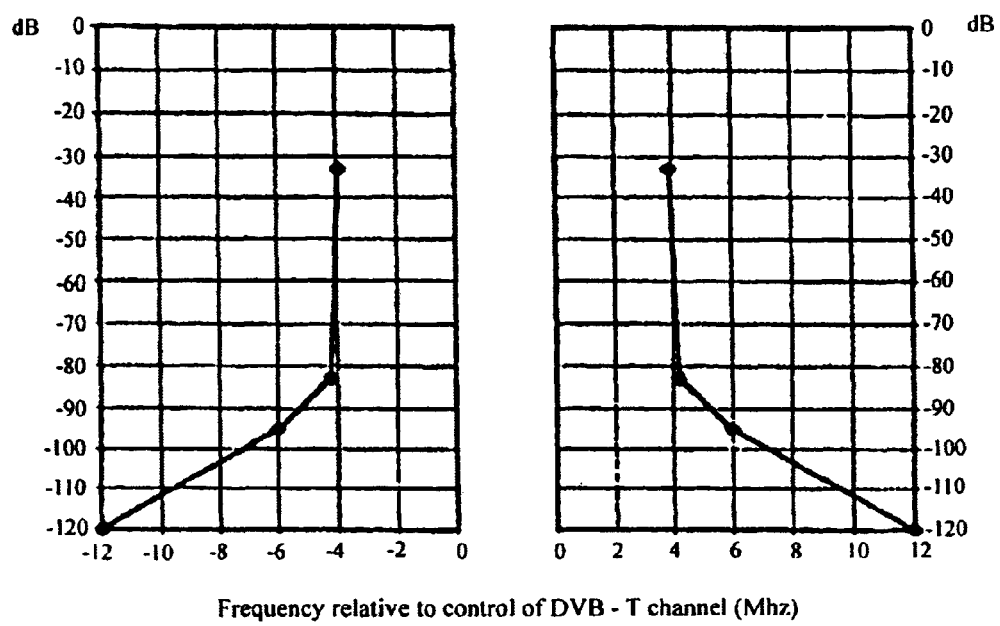
FIG. 18 illustrates Out-Of-Band Spectrum mask for a 8 MHz DVB-T transmission

The spectrum properties of an OFDM modulation are derived from the FFT/IFFT properties, although there is a natural decay in the Out-Of-Band frequency domain a much tighter spectrum is achieved by using additional measures. For an example the Out-Of-Band spectrum mask for a 8 MHz DVB-T transmission is shown in the FIG. 18. FIG. 18 illustrates Out-Of-Band Spectrum mask for a 8 MHz DVB-T transmission.

Comparing OFDM to a Single Carrier where using a roll-off factor of 0.25–0.35, it can be seen that OFDM modulation achieves much more efficient spectrum properties with no degradation in the performance, whereas in the Single Carrier there is a degradation of 0.5–1.5 dB.

6,6 Power Amplifier Efficiency

From sections 6.3–6.5, we notice that for high modulation scheme, the crest factor of an OFDM transmission can be achieved to be even lower than for single carrier transmission. Furthermore, considering the spectrum efficiency of the OFDM modulation, we can derive that the power amplifier usage for an OFDM transmission is very high, and a power control mechanism allows the better usage of the Power Amplifier. In particular, these conclusions are enhanced for an Uplink transmission, while for a Single Carrier transmission the same power efficiency is achieved.

For an OFDM transmission, where the user is allocated a subchannel, the total power transmitted is divided between less carriers, to achieve an additional power gain of 12 dB (for a case were the symbol is divided for 16 users).

6.7 Timing sensitivity

In an OFDM modulation, there is no timing sensitivity within the sample time and simple phase and channel estimators correct inaccuracies. Furthermore the Guard Interval of the transmissions insures immunity in the face of multipath or unsynchronized reception of OFDM transmission from several sources. In particular this fact enables the creation of SFN on the DownLink, and of a very relaxed timing synchronization demands of Subscriber Units in the Uplink.

6.8 Frequency sensitivity

OFDM symbol demodulation is sensitive to frequency inaccuracies. This sensitivity is solved by accurate AFC loops using DDS. Using the above approach all Subscriber Units lock on the Base Station frequency as explained in 6.2. In doing so they ensure that their own transmission is kept orthogonal to other Subscribers, and the total OFDM symbol shall remain orthogonal.

6.9 Equalizations

While in Single Carrier equalizers are a must, and the transmission of a training sequence (and the lost of data rate) is needed, in an OFDM system time sensitivity is relaxed and a channel estimator is the only thing needed in order to fix the timing demands and channel imparities.

6.10 Group Delay

Figure 19:
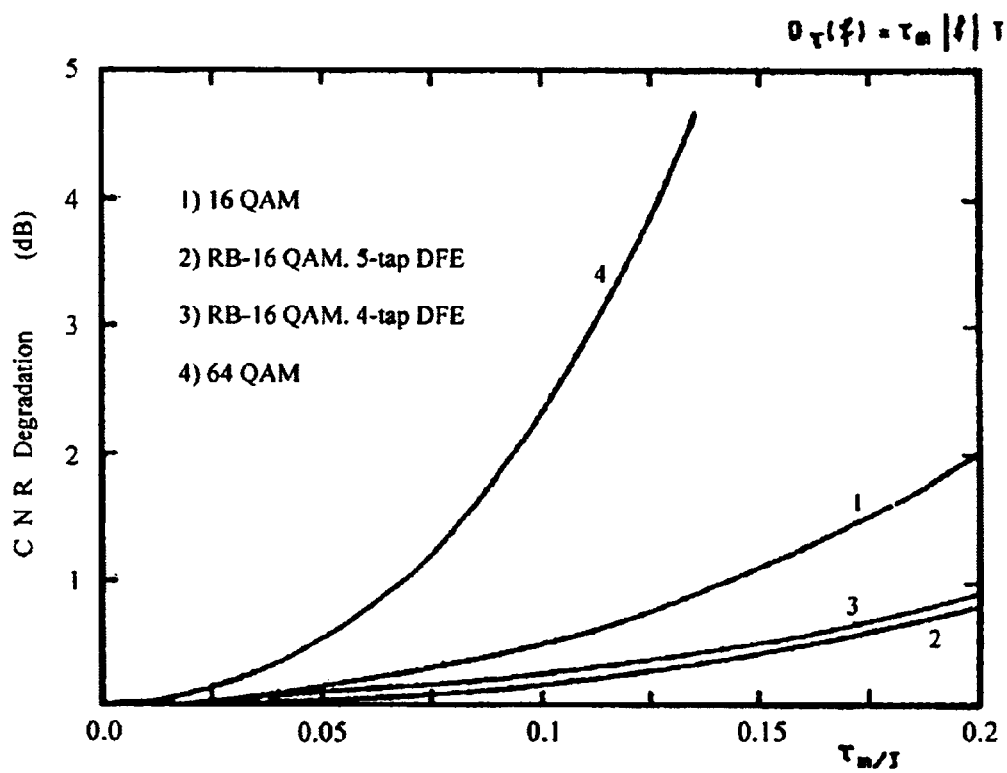
FIG. 19 illustrates the influence of linear Group-Delay in Single Carrier system

The same channel estimators mentioned in 6.7–6.9 can compensate group Delay caused by filters. The Group Delay introduced is treated like a channel imparity. Single Carrier systems are very much influenced by Group Delay as Shown in FIG. 19. In our System, it is expected to be in the 0.15–0.2 (see calculation and assuming a group delay of 10 nsec).

In our System, it is expected to be in the 0.15–0.2 Tm/T (see calculation).

FIG. 19 illustrates the influence of linear Group-Delay in Single Carrier system.

6.11 Burst Efficiency

Upstream bursts of Subscriber User are very efficient because of a low overhead. Subscriber Unit that has been allocated to one subchannel has only 14% (16 of 112 carriers) of the carriers dedicated to pilots (these are used for all receiver demands for time, power and frequency control, and are also used for channel estimation). If user is allocated more subchannels there is no need for further increase of pilots number, so for 2 subchannel efficiency shall rise and the overhead decreases to 7% (16 of 224 carriers), if all band is given to the user the overhead shall be less than 1%

6.12 Sectorization, Cross Polarization and Diversity

Sectorization, Cross Polarization and Diversity can be used in an OFDMA system as well, and may give many advantages.

7. Comparison between OFDMA and Single Carrier TDKA

The following table is a rough comparison between OFDMA and a Single Carrier System using TDD, numbers were derived from experience, simulations and articles.

| Criteria | OFDMA | S.C. TDMA |
| --- | --- | --- |
| Preamble | To mitigate the affects of multi-path in our system a short Guard Interval is introduced. Maximum of 32 samples of G1 and 2048 of Symbol - 1.5%. | 30–50% of the capacity |
| Crest Factor | Using hard clipping has described in 5.4:<br>QPSK 2k carriers - 6.5 dB<br>QPSK 128 carriers - 5.5 dB<br>16QAM 2k carriers - 7.5 dB<br>16QAM 128 carriers - 6.5 dB<br>64QAM 2k carriers - 8.5 dB<br>64QAM 128 carriers - 7.5 dB | With Roll Off Factor of 0.25:<br>QPSK - 6 dB<br>16QAM - 7.4 dB<br>64QAM - 8.8 dB |
| Sensitivity to Group Delay | Solved by channel estimator as other channel impairments | There is a need of a DFE equalizer, a lose of 1 db is introduced |
| Spectrum shape | Brick wall | Depends on Roll-Off Factor |
| Sampling in time | Not sensitive and solved by channel estimator as other channel impairments | Very sensitive to sampling point and needs high clock rate for a $\frac{1}{16}$ timing accuracy |
| Maximum Range | 4 times X, due to efficient power amplifier usage. 12 dB better the S.C, when power is used on only $\frac{1}{16}$ the carrier amount. | X |
| Capacity Rain Fade and Fluctuation | 64QAM must of the time Degrading to QPSK. | QPSK, 16QAM None. |
| Price | Cheaper due to simpler P.A. at CPE | Expensive CPE |
| Statistical multiplexing and Overhead | 10 time higher capabilities in multiplexing due to higher capacity and low Overhead which need not to be increased on more Data rate or Bandwidth supplied. | Poor multiplexing and very big overhead. |
| Reuse Factor | Can statistically go down near to one by reducing frequency usage of the carriers | Can use adaptive slots allocation out of sub group slots but has propagation time design, reducing capacity considerably |
| Peak EIRP | Lower peak power due to Sub-channel allocation | High peak power, 12 dB higher |

8. Calculations

The next calculations are for the Downlink/Uplink transmissions.

Bandwidth=28 MHz
OFDM Carriers=2048
Carriers in use=1792
Sample Rate=28 MHz*(2048/1792)=32 MHz
Carriers Distance=Bandwidth/Carriers in use=15625 Hz
Guard interval $\frac{1}{128}$=16 samples=500 nsec
Frame duration=(2048+16)/32 MHz 64.5 usec 8.1 Downlink
Pilot Carriers per OFDM symbol=80 carriers
Data carriers in use=1792−80=1712
Symbol rate=1712 carriers/Frame Duration=26.543 Msps
Total throuput (QPSK) before ECC 53.085 Mbps
Total throuput (16 QAM) before ECC 106.17 Mbps
Total throuput (64 QAM) before ECC=159.26 Mbps 8.2 Uplink
Number of Carriers used for Uplink contention=64
Number of Subchannels per OFDM frame=16 Subchannels
Number of carriers per on Sub channel allocation=108 carriers Pilot Carriers per Subscriber Unit=16 carriers Data carriers assuming n Subchannel for a specified Subscriber Unit (n ranging from 1 to 16)=108*n−16

Data carriers assuming 1 Subchannel for a specified Subscriber Unit 108−16=92 carriers Data carriers assuming 16 Subchannel for a specified Subscriber Unit=1792−64−16=1712 carriers Symbol rate assuming best subchannel allocation (all Subchannels per Subscriber unit) (1792−64−16) carriers/Frame Duration 26.543 Msps Symbol rate assuming worst subchannel allocation (one per Subscriber unit) (1792−64−16*16) carriers/Frame Duration=22.822 Msps Symbol rate per subchannel (Worst allocation)=1.4264 Msps Total throuput (QPSK) before ECC, worst allocation 45.643 Mbps Total throuput (16 QAM) before ECC, worst allocation 91.287 Mbps Total throuput (64 QAM) before ECC, worst allocation= 136.93 Mbps TDMA frame length=16 OFDM symbols TDMA frame duration=16*64.5 usec=1.032 msec

9. Phase Noise Simulations

The following analysis deals with the influence of phase noise on OFDM and Single Carrier Systems.

In order to check the phase noise influence a simulation was written in MATLAB, using a model suggested in prior art.

The model simulates the phase noise by using a white Gaussian process filtered with a single pole low pass filter, the rational for using this model is a typical behavior of phased-locked microwave oscillators.

The spectrum for the phase noise simulation has a Phase Variance of −26 dB.

Using this Phase Noise model we tested an OFDM and a Single Carrier (S.C) system for their BER/SNR performance with different Phase Variance (P.V) values. The OFDM system used is more precisely described in prior art. We will just indicate that the system uses a 28 MHz bandwidth and has 2048 carriers, the system works with a 32 MHz clock. The S.C. system used has the same bandwidth and works with a 28 MHz clock, no pulse shaping has been applied. Both systems were tested for a 16 QAM modulation.

Figure 20:
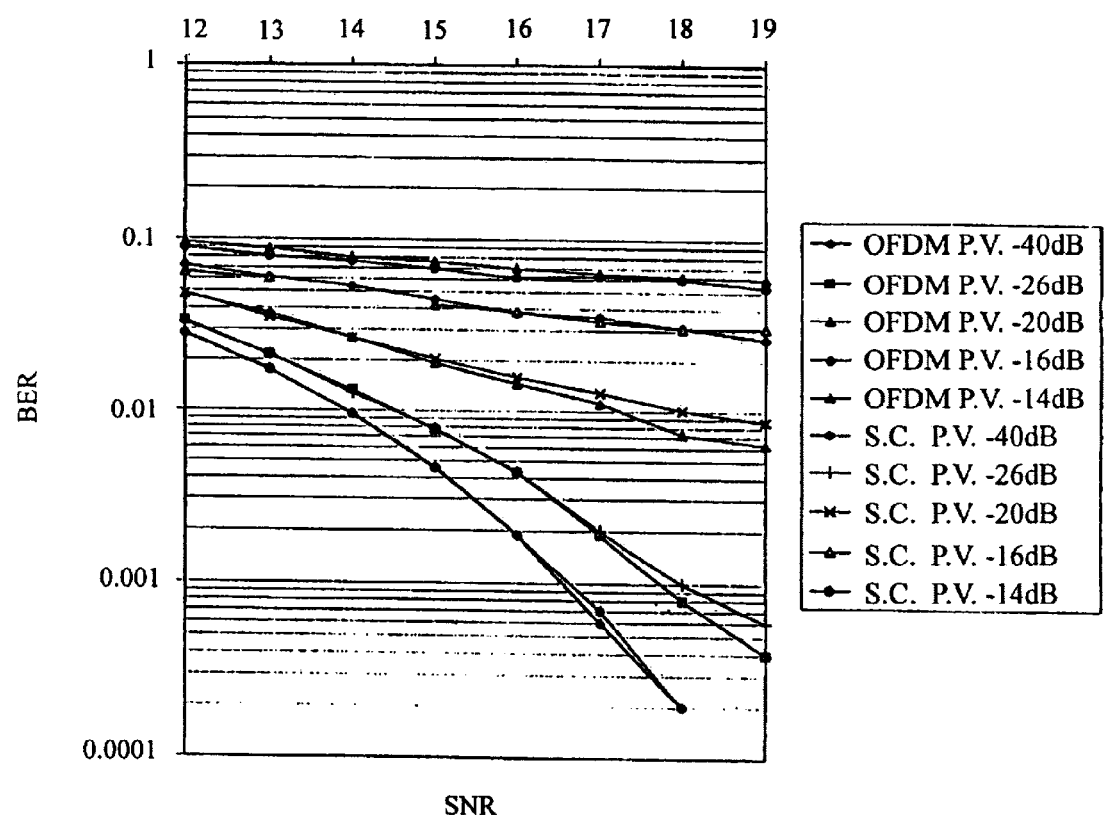
FIG. 20 illustrates the BER/SNR of the OFDM and S.C. systems for different Phase Variance (P.V.) values.

FIG. 20 illustrates the BER/SNR of the OFDM and S.C. systems for different Phase Variance (P.V.) values.

10. Conclusions

It will be noticed that the difference between the systems is minor and is in the favor of the OFDM system. For a synthesizer that has a better Phase Variance than −40 dB, no performance degradation occurs. For a synthesizer with a Phase Variance of −26 dB a degradation of 0.5–2 dB occurs.

Such a synthesizer has a phase noise of about −80 dBc at 1 KHz and −90 dBc at 10 KHz.

These conclusions are different from some results presented in prior art. However, the results from the simulation are consistent to those achieved in prior art as summarized in CHAYAT, May 1998.

Various modifications of the preferred embodiment are possible without departing from the scope of the present invention, and many of these would be obvious to skilled in the art.

Although the invention has been described in connection with a preferred embodiment, it is to be understood that this description is not intended to limit the invention thereto. Rather, the invention is intended to cover all modification and/or additions to the abovementioned description, without departing from the spirit and scope of the invention.

What is claimed is:

1. In an OFDM-based receiver, a channel sounder comprising:

A. means for extracting pilot signals contained in the OFDM received signal;

B. means for analyzing the pilot signals in the frequency domain and for issuing signals indicative of a distortion in each pilot signal, wherein each of said pilot distortion signals comprises both an amplitude and a phase component; and C. means for analyzing the signals indicative of a distortion in each pilot signal and for computing therefrom corrective signals for correcting distortions in the received signal, further including means for computing an average distortion of two adjacent pilots and for using that average to correct the information between these pilots.

2. In an OFDM based receiver, a channel sounder comprising:

A. means for extracting pilot signals contained in the OFDM received signal;

B. means for analyzing the pilot signals in the frequency domain and for issuing signals indicative of a distortion in each pilot signal, wherein each of said pilot distortion signals comprises both an amplitude and a phase component; and C. means for analyzing the signals indicative of a distortion in each pilot signal and for computing therefrom corrective signals for correcting distortions in the received signal, further including means for computing, for each frequency between two adjacent pilots, an interpolated value of the distortion, and for using that interpolated value to correct the information at that frequency.

3. The channel sounder according to claim 2, wherein the interpolation is performed in the time domain or the frequency domain.

4. The channel sounder according to claim 2, wherein the interpolation is performed using a low pass filter or a FIR or convolver.

* * * * *